US011277185B2

(12) United States Patent
Park et al.

(10) Patent No.: US 11,277,185 B2
(45) Date of Patent: Mar. 15, 2022

(54) MULTI-BEAM OPERATION WITH A SINGLE TCI STATE

(71) Applicant: QUALCOMM Incorporated, San Diego, CA (US)

(72) Inventors: Sungwoo Park, San Diego, CA (US); Arumugam Chendamarai Kannan, San Diego, CA (US); Tao Luo, San Diego, CA (US); Xiaoxia Zhang, San Diego, CA (US); Jing Sun, San Diego, CA (US); Mostafa Khoshnevisan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/867,443

(22) Filed: May 5, 2020

(65) Prior Publication Data

US 2020/0358505 A1 Nov. 12, 2020

Related U.S. Application Data

(60) Provisional application No. 62/846,567, filed on May 10, 2019.

(51) Int. Cl.
```
H04B 7/06        (2006.01)
H04L 27/26       (2006.01)
H04B 7/0456      (2017.01)
```
(52) U.S. Cl.
CPC ......... *H04B 7/0626* (2013.01); *H04B 7/0456* (2013.01); *H04B 7/0639* (2013.01); *H04L 27/2613* (2013.01)

(58) Field of Classification Search
CPC ... H04B 7/01; H04B 7/06; H04B 7/08; H04B 7/0456; H04B 7/0626; H04B 7/0639; H04J 13/00; H04J 13/0003; H04L 1/18; H04L 1/1614; H04L 1/1832; H04L 5/00; H04L 25/02; H04L 27/26; H04L 27/2631;
(Continued)

(56) References Cited

U.S. PATENT DOCUMENTS

2019/0215701 A1* 7/2019 Honglei ................. H04W 24/02
2019/0253220 A1* 8/2019 Kim ...................... H04L 5/0053
(Continued)

FOREIGN PATENT DOCUMENTS

WO     2018232090 A1    12/2018

OTHER PUBLICATIONS

International Search Report and Written Opinion—PCT/US2020/031683—ISA/EPO—dated Jul. 20, 2020.
(Continued)

*Primary Examiner* — Shawkat M Ali
(74) *Attorney, Agent, or Firm* — Patterson+ Sheridan, L.L.P.

(57) ABSTRACT

Certain aspects of the present disclosure provide techniques for multiple beam downlink data transmission while indicating only a single transmission configuration indicator (TCI) state. A method that may be performed by a user equipment (UE) includes receiving a single TCI state from a base station (BS). The UE determines one or more UE receive beams based, at least in part, on the TCI state. The UE receives a multi-beam data transmission from the BS using the determined one or more UE receive beams.

45 Claims, 17 Drawing Sheets

(58) Field of Classification Search
CPC ....... H04W 8/24; H04W 16/28; H04W 24/02;
H04W 56/00; H04W 72/04; H04W 72/12;
H04W 72/042; H04W 72/046; H04W
72/1289; H04W 76/27; H04W 88/06
USPC ......... 370/329–333; 375/219, 260, 267, 295,
375/316
See application file for complete search history.

(56) References Cited

U.S. PATENT DOCUMENTS

2019/0334603 A1\* 10/2019 Venugopal ........... H04B 17/309
2020/0267571 A1\* 8/2020 Park .................... H04W 72/046
2020/0344791 A1\* 10/2020 Park ..................... H04L 5/0023

OTHER PUBLICATIONS

ZTE: "Enhancements on Multi-TRP/Panel Transmission", 3GPP Draft, 3GPP TSG RAN WG1 Meeting #95, R1-1812256 Enhancements on Multi-TRP/Panel Transmission, 3rd Generation Partnership Project (3GPP) Mobile Competence Centre, 650, Route Des Lucioles, F-06921 Sophia-Antipolis, vol. RAN WG1, No. Spokane, USA, Nov. 12, 2018-Nov. 16, 2018, Nov. 3, 2018 (Nov. 3, 2018), XP051478423, pp. 1-14.

\* cited by examiner

MULTI-BEAM OPERATION WITH A SINGLE TCI STATE

CROSS-REFERENCE TO RELATED APPLICATION(S)

This application claims benefit of and priority to U.S. Provisional Application No. 62/846,567, filed May 10, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for multiple beam operation.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include multiple beam operation with a single transmission configuration indicator (TCI) state.

Certain aspects provide a method for wireless communication by a user equipment (UE). The method generally includes receiving a single TCI state from a base station (BS). The method generally includes determining one or more UE receive beams based, at least in part, on the TCI state. The method generally includes receiving a multi-beam data transmission from the BS using the determined one or more UE receive beams.

Certain aspects provide a method for wireless communication by a BS. The method generally includes determining multiple transmit beams to use for sending a multi-beam data transmission. The method generally includes sending a UE a single TCI state. The method generally includes sending a multi-beam data transmission to the UE.

Certain aspects provide an apparatus for wireless communication. The apparatus generally includes means for receiving a single TCI state from another apparatus. The apparatus generally includes means for determining one or more receive beams based, at least in part, on the TCI state. The apparatus generally includes means for receiving a multi-beam data transmission from the another apparatus using the determined one or more receive beams.

Certain aspects provide an apparatus for wireless communication. The apparatus generally includes means for determining multiple transmit beams to use for sending a multi-beam data transmission. The apparatus generally includes means for sending a single TCI state to another apparatus. The apparatus generally includes means for sending a multi-beam data transmission to the another apparatus.

Certain aspects provide an apparatus for wireless communication. The apparatus generally includes a memory and at least one processor coupled with the memory. The processor and memory are generally configured to receive a single TCI state from another apparatus; determine one or more receive beams based, at least in part, on the TCI state; and receive a multi-beam data transmission from the another apparatus using the determined one or more receive beams.

Certain aspects provide an apparatus for wireless communication. The apparatus generally includes a memory and at least one processor coupled with the memory. The processor and memory are generally configured to determine multiple transmit beams to use for sending a multi-beam data transmission; send a single TCI state to another apparatus; and send a multi-beam data transmission to the another apparatus.

Certain aspects provide a computer readable medium having computer executable code stored thereon. The computer readable medium generally includes code for receiving a single TCI state from a BS; code for determining one or more UE receive beams based, at least in part, on the TCI state; and code for receiving a multi-beam data transmission from the BS using the determined one or more receive beams.

Certain aspects provide a computer readable medium having computer executable code stored thereon. The computer readable medium generally includes code for determining multiple transmit beams to use for sending a multi-beam data transmission; code for sending a single TCI state to a UE; and code for sending a multi-beam data transmission to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
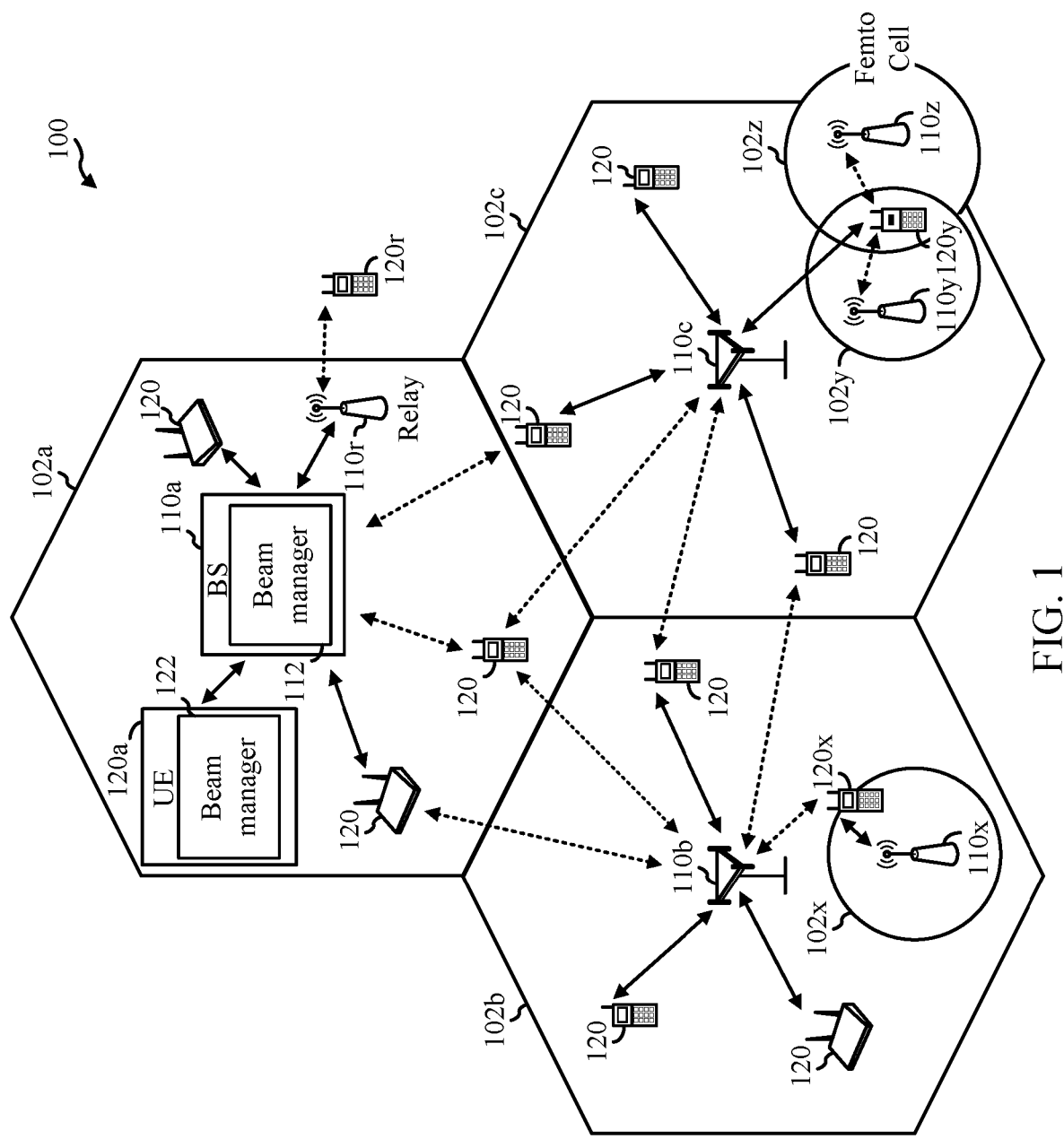
FIG. 1 is a block diagram conceptually illustrating an example telecommunications system, in accordance with certain aspects of the present disclosure.
Figure 1:
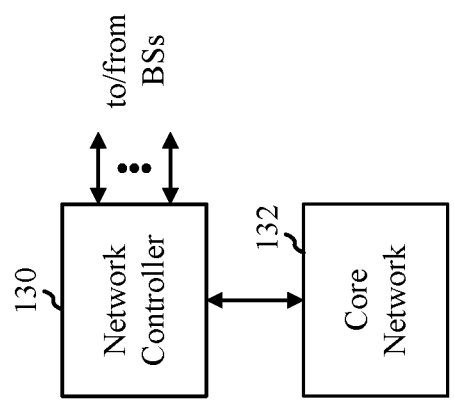

Aspects of the present disclosure provide apparatus, methods, processing systems, and computer readable mediums for multiple beam (multi-beam) operation with a single transmission configuration indicator (TCI) state (also sometimes referred to as a transmission configuration indication state).

In certain systems (e.g., Release 15 5G NR systems), beam management procedures are designed for single-beam operation. In single-beam operation, a user equipment (UE) and a base station (BS) communicate using a single transmit (TX) beam and a single receive (RX) beam, referred to as a beam pair. In one example, on the downlink, the BS transmits using a single TX beam, and the UE receives using a single RX beam. The UE and BS can perform beam management procedures to discover and/or refine beam pair(s) used for communication between the UE and the BS. Based on the beam management procedures, the UE may perform analog detecting (e.g., analog beamforming) to receive, and/or the BS may perform analog precoding (e.g., analog beamforming) to transmit, using the determined beams of the beam pair. A beam pair may correspond to a single TCI state. As discussed in more detail below, the BS may send the UE the TCI state, which may generally indicate to the UE an association between a downlink reference signal to a corresponding quasi-collocation (QCL) type. Based on the TCI state, the UE may determine the receive beam to use for receiving a transmission.

Some systems may use multi-beam operation. In some cases, the single-beam beam management procedure and operations can be extended to the multi-beam operations case; such as by increasing the number of the TCI states. For example, each TCI state can indicate to the UE to use one RX beam to receive one TX beam of the BS and, therefore, multiple TCI states indicate multiple TX beams.

Certain aspects of the present disclose provide for efficient multi-beam operation using a single TCI state, such as to allow low signaling overhead to indicate multiple TCI states. In some examples, adjusted beam management procedures are provided for the multi-beam operation with a single TCI state. For example, a new RX beam refinement procedure may involve the determining the best RX beam(s) for receiving a multiple TX beam transmission. A new channel state information (CSI) reporting procedure may also involve measuring and reporting CSI for a multiple TX beam transmission. In some examples, using the new procedures, a single TCI state can be used to indicate the beams to use for multi-beam transmission. In some examples, hybrid precoding and detecting is provided for the multi-beam operation with a single TCI state. Hybrid precoding and detecting may involve use of both analog precoding/detecting and digital precoding/detecting.

The following description provides examples of multi-beam operation with a single TCI state, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

A network controller 130 may couple to a set of BSs 110 and provide coordination and control for these BSs 110. The network controller 130 may communicate with the BSs 110 via a backhaul.

The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for multi-beam operation with a single TCI state. As shown in FIG. 1, the UE 120a includes a beam manager 122. The beam manager 122 may be configured to receive a single TCI state from the BS 110a, in accordance with aspects of the present disclosure. The beam manager 122 may be configured to determine one or more UE receive beams based, at least part, on the TCI state, in accordance with aspects of the present disclosure. The RX beam manager 122 may be configured to receive a multi-beam data transmission from the BS 110a using the determined one or more RX beams, in accordance with aspects of the present disclosure. As shown in FIG. 1, the BS 110a includes a beam manager 112. The beam manager 112 may be configured to determine multiple TX beams to use for a multi-beam data transmission, in accordance with aspects of the present disclosure. The beam manager 112 may be configured to send the UE 120a a single TCI to indicate the multiple TX beams, in accordance with aspects of the present disclosure. The beam manager 112 may be configured to send the UE 120a a multi-beam data transmission, in accordance with certain aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
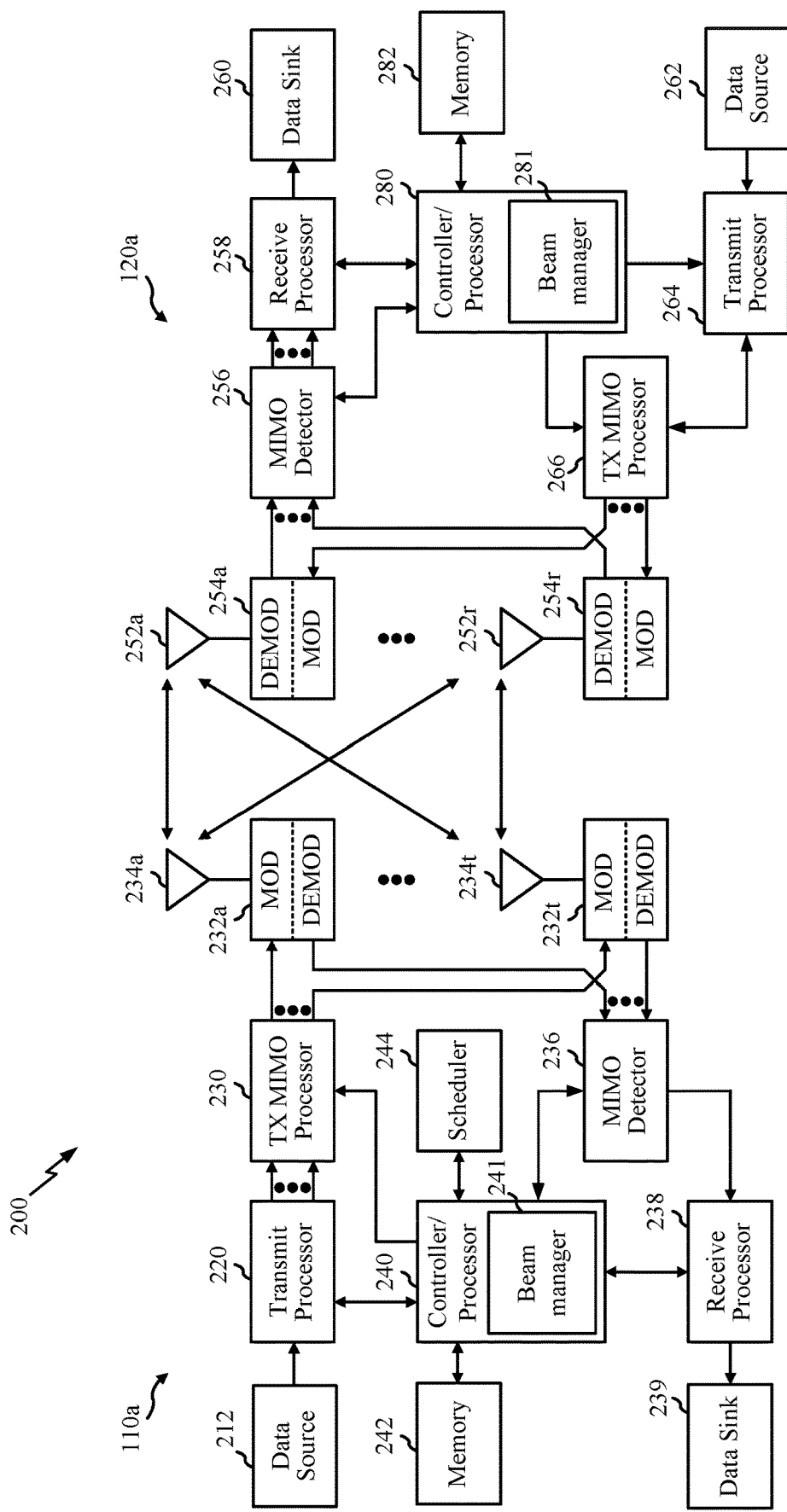
FIG. 2 is a block diagram conceptually illustrating a design of an example base station (BS) and a user equipment (UE), in accordance with certain aspects of the present disclosure.

FIG. 2 illustrates example components of BS 110a and UE 120 (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 1656 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. The controllers/processors 240 and 280 may direct the operation at the BS 110a and the UE 120a, respectively. The memories 242 and 282 may store data and program codes for BS 110a and UE 120a, respectively. A scheduler 244 may schedule UEs for data transmission on the downlink and/or uplink. As shown in FIG. 2, the controller/processor 280 of the UE 120a has a beam manager 281 that may be configured for multi-beam operation with a single TCI state, according to aspects described herein. The controller/processor 240 of the BS 110a has a beam manager 241 that may be configured for multi-beam operation with a single TCI state, according to aspects described herein. Although shown in the controller/processor, one or more of the operations may be performed by different modules of the BS 110a and/or UE 120a shown in FIG. 2, which may be directed by the controller/processor.

NR may utilize orthogonal frequency division multiplexing (OFDM) with a cyclic prefix (CP) on the uplink and downlink and include support for half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
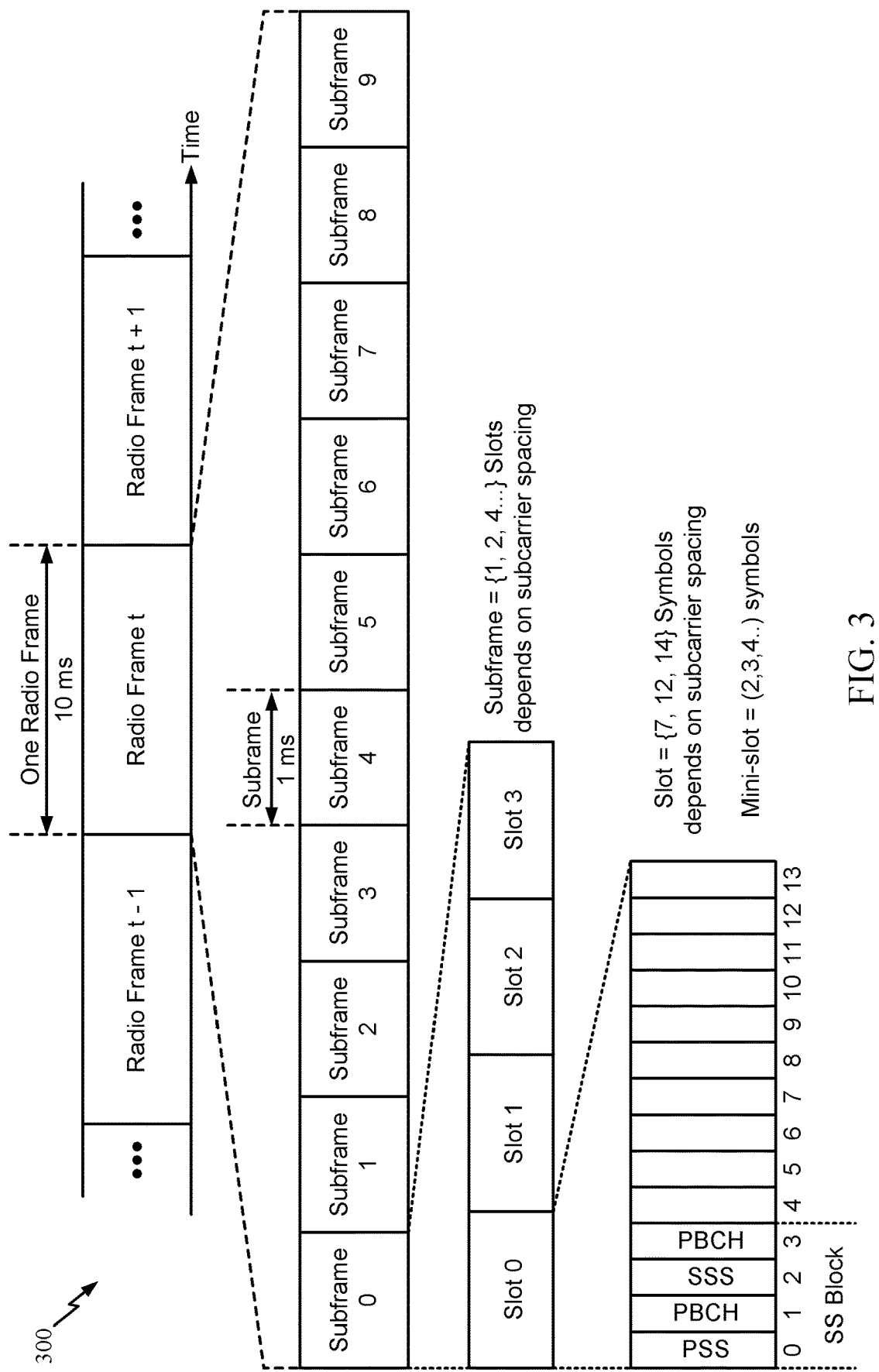
FIG. 3 is an example frame format for certain wireless communication systems, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As mentioned above, aspects of the present disclosure relate to multi-beam operation with a single TCI state and the TCI state may indicate a QCL relation (e.g., QCL assumption).

For a set of signals or channels considered to be QCL related (e.g., referred to as QCL'd), certain characteristics derived for (measured from) one of the signals or channels may be applied to the other. Two antenna ports are said to be QCL'd if properties of the channel over which a symbol on one antenna port is conveyed can be inferred from the channel over which a symbol on the other antenna port is conveyed. As an example, if a PDSCH demodulation reference signal (DMRS) is QCL'd with another downlink RS, the UE (e.g., such as UE 120a) may process the PDSCH based on measurements of the other QCL'd downlink RS. In some cases, this may lead to more efficient processing, allowing the UE to use (reuse) previous measurements of the QCL'd RS, which may speed processing of a current channel. The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal.

As mentioned above, the QCL assumption for reception/transmission of a signal and/or channel can be indicated via a TCI state. In some cases, the UE (e.g., such as the UE 120a) is configured with multiple TCI states (e.g., a set of up to M TCI states, such as 64 or 128 TCI-states) via a higher layer parameter (e.g., PDSCH-Config), which may be configured by radio resource control (RRC) signaling. A higher layer parameter can configure the QCL type (e.g., qcl-Type in QCL-Info) and QCL'd downlink RS(s) associated with the TCI states (e.g., having TCI state IDs). The UE may receive an activation command, such as by a medium access control control element (MAC-CE), to map one or more of the higher layer configured TCI states (e.g., up to 8 TCI states) to the codepoints of a TCI field in downlink control information (DCI). Thus, in some examples, DCI may indicate one of the active TCI states. For example, a 3-bit indicator in the DCI can indicate a TCI state that is valid for a scheduled transmission.

In some examples, a higher layer parameter (e.g., tci-PresentInDCI) can indicated whether TCI state indication is "enabled". If the TCI state indication is enabled, the TCI field in the DCI scheduling a component carrier points to the activated TCI states in the scheduled component carrier or DL bandwidth part (BWP). In some examples, when a PDSCH is scheduled, then the UE uses the TCI-state according to the value of the TCI field in the DCI to determine PDSCH antenna port QCL information.

As mentioned above, a TCI state may indicate a QCL relation with a downlink RS. In some examples, the related DL RS is the channel state information (CSI) reference signal (CSI-RS). As discussed in more detail below, CSI-RS may be used for various purposes, such as CSI acquisition, tracking, and beam management.

Figure 4:
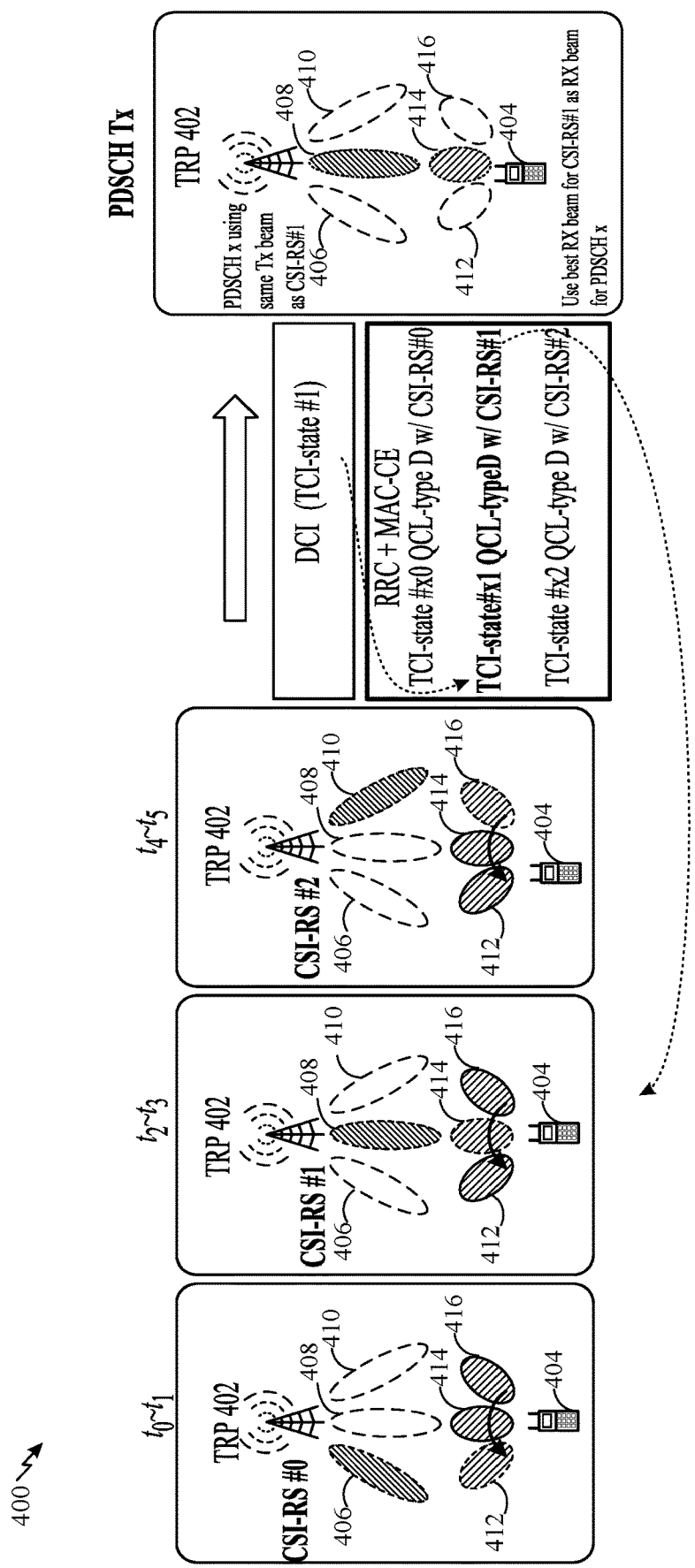
FIG. 4 illustrates an example of a transmission configuration indicator (TCI) state, in accordance with certain aspects of the present disclosure.

FIG. 4 illustrates an example of a TCI state indication and beam management. As shown in FIG. 4, a TCI-state can be used for UE receive (RX) beam determination (e.g., by indicating a corresponding BS TX beam). As shown in FIG. 4, the UE can perform a receive beam sweeping for each of a number of BS transmit (TX) beams. For example, the BS repeats CSI-RS transmission using a TX beam while the UE performs the RX beam sweeping, and then move to the next TX beam, and so on. This allows the UE determine the best RX beam corresponding to each of the TX beams.

As shown in the example illustrated in FIG. 4, at time $t_0$-$t_1$, the TRP 402 (e.g., a BS such as the BS 110a) transmits CSI-RS #0 using a first TX beam 406 and the UE 404 (e.g., such as the UE 120a) performs UE RX beam sweeping (e.g., over the beams 412, 414, 416) to determine the "best" UE RX beam 412 for the CSI-RS #0. For example, the UE 404 may determine the strongest beam, such as the beam having a highest channel quality measurement, the highest signal strength, the highest received power, the highest signal to noise ratio (SNR), the highest reference signal received quality (RSRQ), the highest reference signal received power (RSRP), the highest reference signal strength indicator (RSSI), and/or the like. At time $t_2$-$t_3$, the TRP 402 transmits CSI-RS #1 using a second TX beam 408 and the UE 404 performs the UE RX beam sweeping (e.g., over the beams 412, 414, 416) to determine the best UE RX beam 414 for the CSI-RS #1. At time $t_4$-$t_5$, the TRP 402 transmits CSI-RS #2 using a third TX beam 410 and the UE 44 performs UE RX beam sweeping (e.g., over the beams 412, 414, 416) to determine the best UE RX beam 416 for the CSI-RS #2.

Then, for a PDSCH transmission using one of the TX beams, the TRP sends the TCI state indicating CSI-RS that was used for that TX beam, and the UE then uses the RX beam that was the best RX beam for that TX beam. For example, as shown in FIG. 4, for a PDSCH using the same TX beam 408 as the CSI-RS #1, the TRP 402 sends a DCI to the UE with the TCI field (e.g., codepoint of the DCI) indicating the TCI-state (e.g., TCI-state #x1), of the set of TCI states configured/activated by earlier RRC and/or MAC-CE signaling, corresponding to the QCL relation for the CSI-RS #1 (i.e., the QCL-type D with CSI-RS #1). Thus, the TCI state in the DCI indicates that the UE can use the same RX beam 412 that was used to receive (e.g., the determined best UE RX beam) the CSI-RS #1. The UE can then prepare the RX beam 412 (e.g., the analog RX beam) prior to PDSCH reception and decode the PDSCH by using the RX beam 412.

Figure 5:
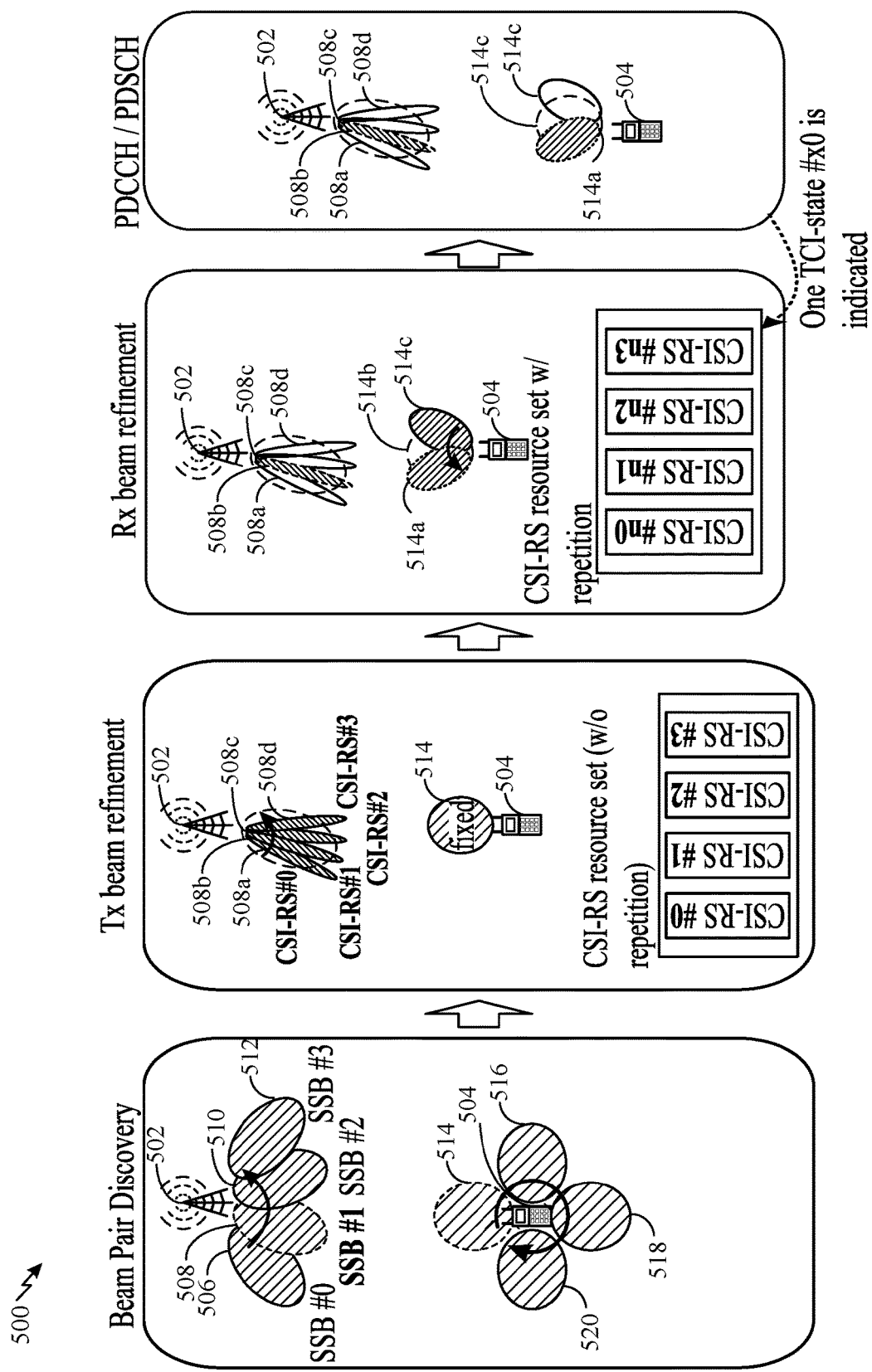
FIG. 5 illustrates an example of beam management procedures and TCI-state indication for single-beam operation, in accordance with certain aspects of the present disclosure.

In certain systems (e.g., Release-15 5G NR systems), a beam management procedure may performed for determining beam pairs (e.g., for discovering beam pairings. As shown in FIG. 5, the procedure involves BS TX beam sweeping and UE RX beam sweeping. A BS (e.g., such as the BS 110a) may send a measurement request to a UE (e.g., such as the UE 120a) and may subsequently transmit one or more signals to the UE for measurement. As shown in FIG. 5, the BS 502 transmits the signal with beam forming in a different spatial directions (e.g., a different spatial direction in each symbol), such that several (e.g., most or all) relevant spatial locations of the cell of the BS 502 are reached. In this manner, the BS 502 transmits the signal using different TX beams 506, 508, 510, 512 over time in different directions.

In some examples, such as during initial access, SSB is used as the signal. As shown in FIG. 5, the BS 502 transmits the SSBs #0, #1, #2, #3.

To successfully receive at least a symbol of the signal, the UE finds (e.g., determines) an appropriate receive beam. As shown in FIG. 5, the UE 504 sweeps its receive beams 514, 516, 518, 520 during each occurrence (e.g., each symbol) of the SSB. Once the UE succeeds in receiving a symbol of the SSB, the UE and BS have discovered a beam pairing (i.e., the UE RX beam 514 used to receive the SSB #1 in the symbol and the BS TX beam 508 used to transmit the SSB #1 in the symbol). The UE may not know which beam the BS used to transmit the SSB; however, the UE may report to the BS the time at which it observed the signal. For example, the UE may report the symbol index, in which the SSB was successfully received, to the BS. The BS may receive this report and determine which BS TX beam the BS used at the indicated time. In some examples, the UE measures signal quality of the signal, such as reference signal receive power (RSRP) or another signal quality parameter (e.g., signal-to-noise ratio (SNR), channel flatness, etc.). The UE may report the measured signal quality (e.g., RSRP) to the BS together with the symbol index. In some cases, the UE may report multiple symbol indices to the BS, corresponding to multiple beam pairings.

As a part of a beam management procedure, the beam pairings used between the UE and BS may be refined/changed. For example, the beam pairings may be refined periodically to adapt to changing channel conditions, for example, due to movement of the UE or other objects, fading due to Doppler spread, etc. The UE can monitor the quality of a beam pairing (e.g., a beam pairing found/selected during the beam discovery procedure and/or a previously refined beam pairing) and refine the beam pairing when the quality drops (e.g., when the quality drops below a threshold or when another beam pairing has a higher quality).

As shown in FIG. 5, CSI-RS may be used for beam refinement. In some examples, the BS (e.g., such BS 110a) configures the UE (e.g., such as UE 120a) with a CSI report configuration (or with multiple CSI report configurations). The BS may provide the CSI report configuration to the UE via higher layer signaling (e.g., via a CSI-ReportConfig).

The CSI report configuration may configure the time and frequency resources used by the UE to report CSI. For example, the CSI report configuration may be associated with CSI-RS resources for channel measurement (CM), interference measurement (IM), or both. The CSI report configuration configures CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). The CSI-RS resources can be zero power (ZP) or non-zero power (NZP) resources.

In certain systems (e.g., Release-15 5G NR systems), for beam management (BM), the CSI report configuration configures at most one or two ports used for CSI-RS for BM. For example, when the CSI report configuration configures the UE with a reportQuantity set to "cri-RSRP" or "none"; and configures the resources for CM (e.g., via higher layer parameter resourcesForChannelMeasurement) with a NZP-CSI-RS-ResourceSet that is configured for repetitions (e.g., via higher layer parameter repetition) and without the higher layer parameter trs-Info, then the UE can only be configured with the same number (1 or 2) of ports with the higher layer parameter nrofPorts for all CSI-RS resources within the set.

Thus, for beam management, each CSI-RS resource has only one or two ports and is transmitted with only one TX beam. The CSI-RS resources with a CSI-RS resource set can be transmitted with either the same or different TX beams, depending on the repetition parameter. As shown in FIG. 5, for the TX beam refinement procedure, the CSI-RS resource set is configured without repetition. Thus, to refine the TX beam 508, the BS 502 transmits each CSI-RS #0, #1, #2, #3, using a different BS TX beam in each time instance. For the TX beam refinement procedure, the BS may use TX beams that are spatially close to the B S-beam of the current beam pairing (e.g., neighboring beams). The TX beams used by the BS 502 for the TX beam refinement procedure may be different from the TX beams used by the BS 502 for the beam discovery procedure, for example, the TX beams 508a, 508b, 508c, 508d may be narrower (e.g., more focused) that than the TX beam 508, as shown in FIG. 5. The UE 504 uses the fixed UE RX beam 514 to receive/measure the CSI-RSs to determine the best (e.g., strongest, having a highest signal quality) refined TX beam 508c.

As shown in FIG. 5, for the RX beam refinement procedure, the CSI-RS resource set is configured with repetition. For example, the higher layer parameter repetition in NZP-CSI-RS-ResourceSet is associated with a CSI-RS resource set and defines whether UE can assume the CSI-RS resources within the NZP-CSI-RS Resource Set are transmitted with the same downlink spatial domain transmission filter or not, and can be configured only when the higher layer parameter reportQuantity associated with all the reporting settings linked with the CSI-RS resource set is set to cri-RSRP or none. If the UE is configured with a NZP-CSI-RS-ResourceSet configured with the higher layer parameter repetition set to "on", the UE may assume that the CSI-RS resources within the NZP-CSI-RS-ResourceSet are transmitted with the same downlink spatial domain transmission filter, where the CSI-RS resources in the NZP-CSI-RS-ResourceSet are transmitted in different OFDM symbols. Thus, as shown in FIG. 5, the BS 502 repeats the CSI-RS (e.g., CSI-RS #n0, #n1, #n2, #n3) using the same TX beam 508c (e.g., the best TX beam identified in the TX beam refinement procedure). The UE 504 receives/measures the repeated CSI-RS, each with a different UE RX beam 514a, 514b, 514c, to determine the best UE RX beam 514a for the TX beam 508c and, thereby, the best beam pair.

As shown in FIG. 5, for a PDCCH and/or PDSCH transmission, the BS 502 can send DCI to the UE 504 indicating one TCI state, TCI #x0, indicating the CSI-RS associated with the beam pair and the UE 504 uses the beam pair to receive the PDCCH and/or PDSCH transmission.

Figure 6:
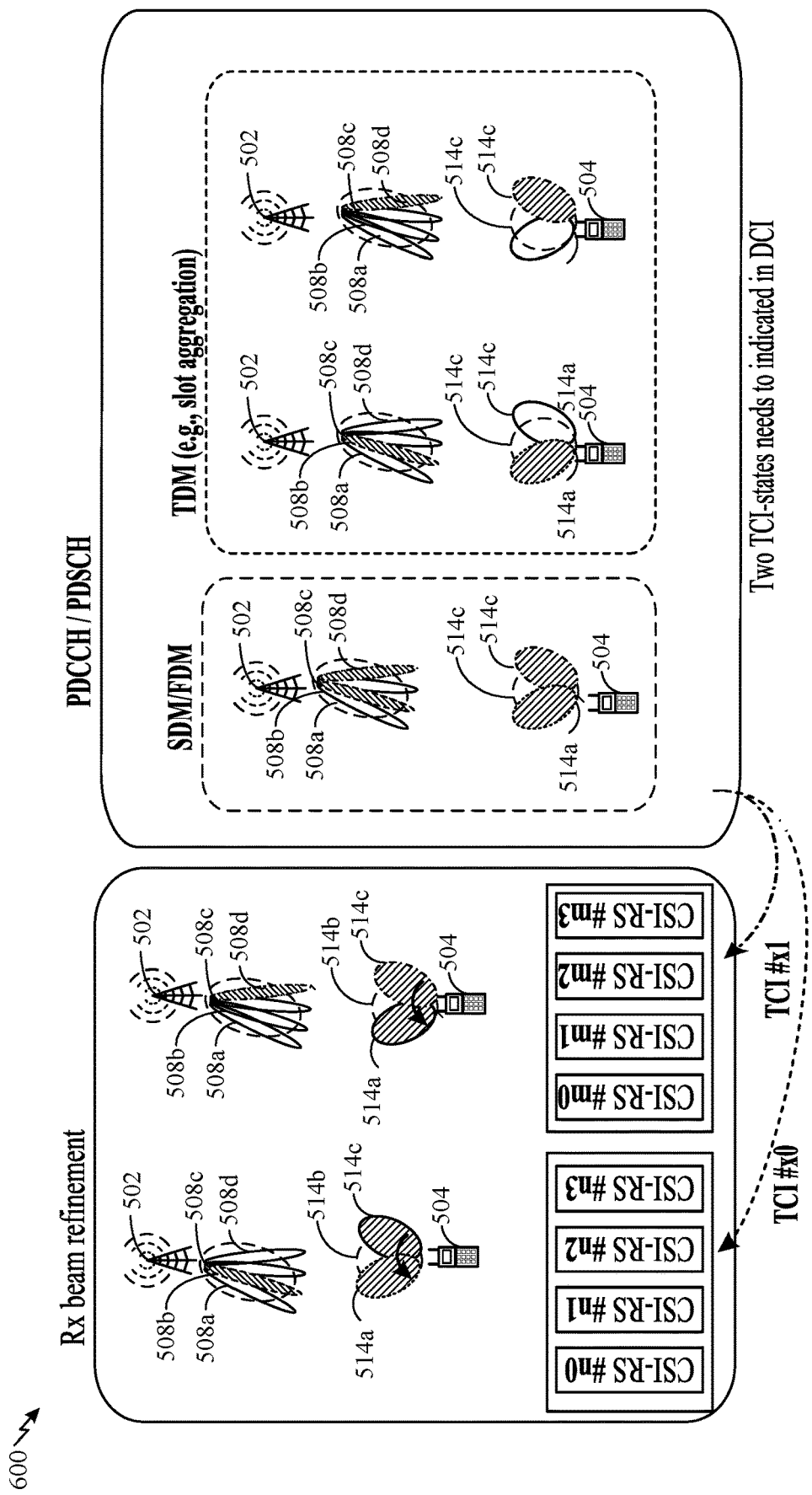
FIG. 6 illustrates an example of beam management procedures and multiple TCI-states indication for multi-beam operation, in accordance with certain aspects of the present disclosure.

As mentioned above, some systems use multi-beam operations, in which multiple TX beams and/or multiple RX beams may be used together to transmit and/or receive a signal (e.g., using combining). As shown in FIG. 6, if the current beam management procedures and the CSI-RS for BM are used for multi-beam operation, then multiple TCI states are needed to indicate the beams, which may be inefficient. For example, as shown in FIG. 6, for multi-beam operation, multiple best beam pairs can be identified. In the example shown in FIG. 6, a best beam pair and a second best pair are identified. For example, in the TX beam refinement procedure, the two best BS TX beams 508b and 508d can be determined and in the RX beam refinement procedure, the best UE RX beam 514a, 514c can be determined for each of the best BS TX beams 508b and 508d, respectively, resulting in the two best beam pairs. For example, in the RX beam refinement procedure, the BS 502 repeats the CSI-RS #n0, #n1, #n2, #n3 using the first best TX beam 514a, while the UE 504 sweeps its RX beams 514*a*, 514*b*, 514*c* to find the best corresponding RX beam 514*a*; and then the BS 502 repeats the CSI-RS #m0, #m1, #m2, #m3 using the second best TX beam 508*d*, while the UE 504 sweeps its RX beams 514*a*, 514*b*, 514*c* to find the best corresponding RX beam 514*c*.

In this case, for a multi-beam PDSCH transmission using the same TX beams as the CSI-RS #n (i.e., the best BS TX beam 508*b*) and CSI-RS #m (i.e., the second best BS TX beam 508*d*), the BS 502 sends DCI (e.g., via the TCI field/codepoint of the DCI) indicating two TCI states (e.g., TCI-state #x1 and TCI-state #x2) to indicate that the UE 504 can use the receive beams 514*a* and 514*c* determined for those CSI-RSs to receive the PDSCH. However, as mentioned above, increasing the number of TCI states may be inefficient and does not fully exploit the benefits of using multiple beams.

Therefore, techniques for efficient multi-beam operation are desirable, which may avoid increasing the number of indicated TCI states.

Example Multi-Beam Operation with a Single TCI State

Accordingly, aspects of the present disclose provide for efficient multi-beam operations with a single transmission indicator state (TCI) state.

As mentioned above, beam management procedures designed for single-beam operations consider only analog beams and a single radio frequency (RF) chain. With multi-beam operation; however, multiple RF chains can be used at both a base station (BS) and user equipment (UE). According to certain aspects of the present disclosure, as will be discussed in more detail below with respect to FIGS. 9A, 9B, and 13, hybrid precoding may be used at the BS and hybrid detecting may be used at the UE, combining both analog precoding/detecting (e.g., beamforming) and digital precoding/detecting (e.g., instead of directly combining the analog beamformers). FIGS. 7, 8, 9A, and 9B illustrate examples of analog precoding/detecting (e.g., beamforming), digital precoding/detecting, and hybrid precoding/detecting, respectively, in accordance with certain aspects of the present disclosure.

Figure 7:
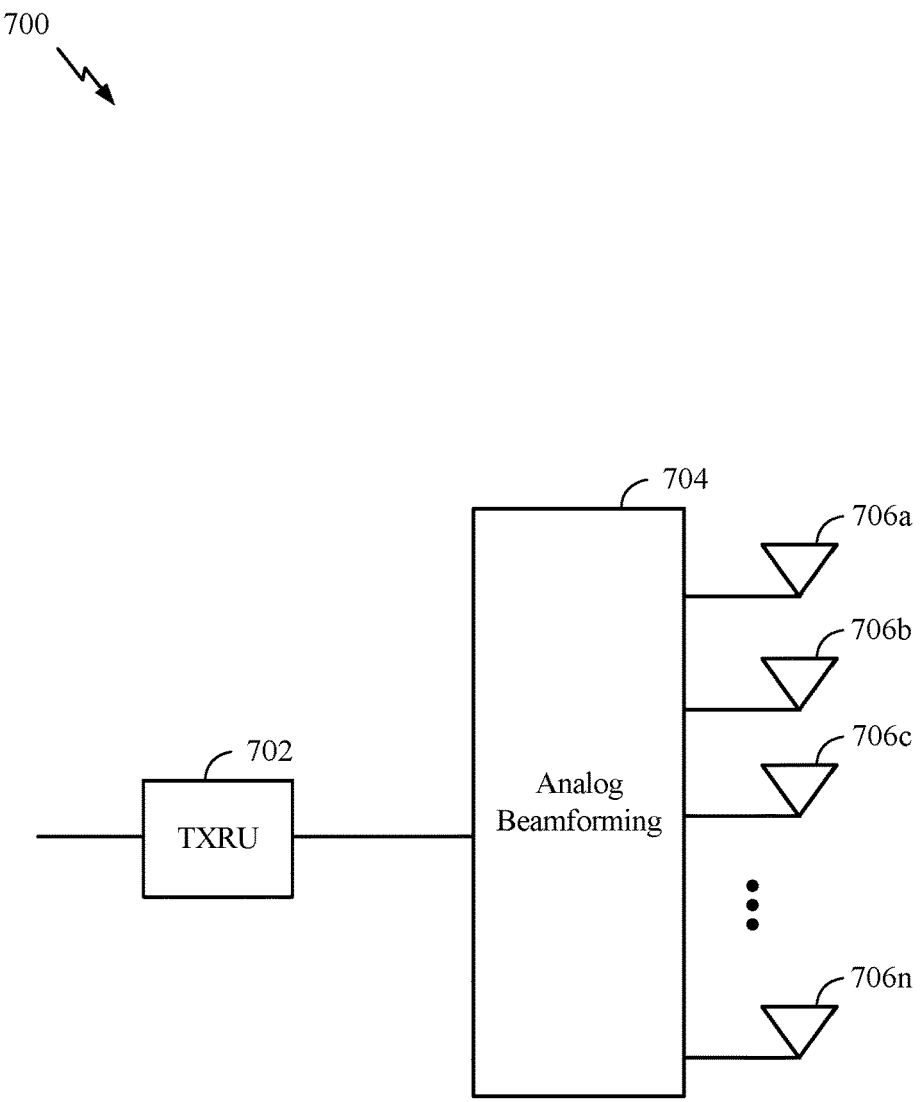
FIG. 7 illustrates an example of analog precoding/detecting (beamforming), in accordance with certain aspects of the present disclosure.

As shown in FIG. 7, analog precoding/detecting unit 704 (e.g., a beamforming unit) may combine the input from/to $N_{ant}$ antennas 706$_{a\ldots n}$ to the transceiver unit (TXRU) 702. A layer may correspond to one RX chain, which may include one DMRS port and one beamformed CSI-RS port. Analog precoding/detecting (e.g., analog beamforming) may not involve the use of a codebook. For example, for rank-1 beamforming, no precoding is needed.

Figure 8:
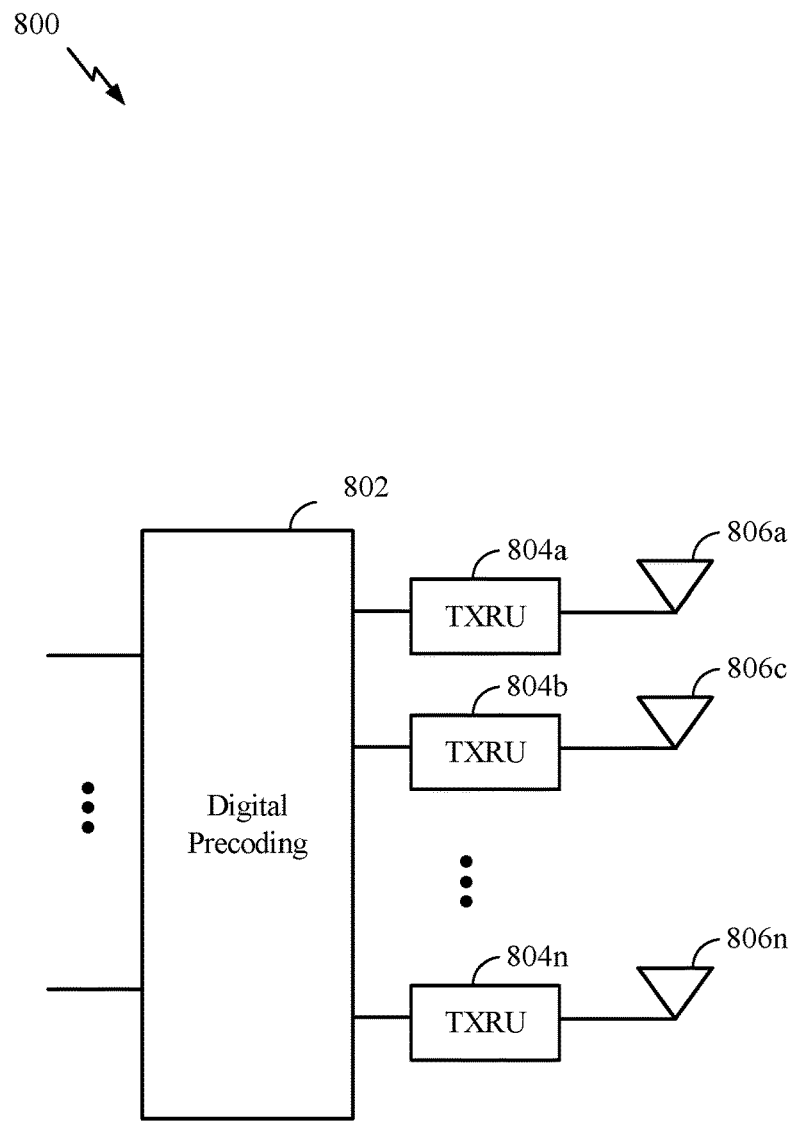
FIG. 8 illustrates an example of digital precoding/detecting, in accordance with certain aspects of the present disclosure.

As shown in FIG. 8, digital precoding/detecting unit 802 (e.g., a baseband unit) has input from a TXRU 804$_{a\ldots n}$ at each of the antennas 806$_{a\ldots n}$. The number of CSI-RS ports and RF chains is equal to $N_{ant}$. The number of demodulation reference signal (DMRS) ports are equal to the number layers $N_{layers}$. Digital precoding/detecting may be suitable for a Type-1 or Type-2 codebook. The Type-1 and Type-2 codebooks are discussed in more detail below. For example, as discussed below the codebooks may be based on a discrete Fourier transform (DFT) matrix, which may be useful when a correlated-element (e.g. 0.5λ spacing), a uniform linear array (ULA), or a uniform planar array (UPA) antenna array is used (with or without polarization). For a Type-1 single-panel codebook, 2, 4, 8, 12, 16, 24, or 32 ports may be supported; for a Type-1 multi-panel codebook, 8, 16, 32 ports may be supported; and for a Type-2 codebook, 2, 4, 8, 12, 16, 24, or 32 ports may be supported. For the Type-1 codebook, up to 8 layers may be supported and for the Type-2 codebook up to 2 layers may be supported. While the Type-1 codebook focuses the beam(s) on a single channel cluster, the Type-2 codebook focuses the beams on multiple channel clusters (i.e., more accurate precoding matrix indictor (PMI)).

Figure 9A:
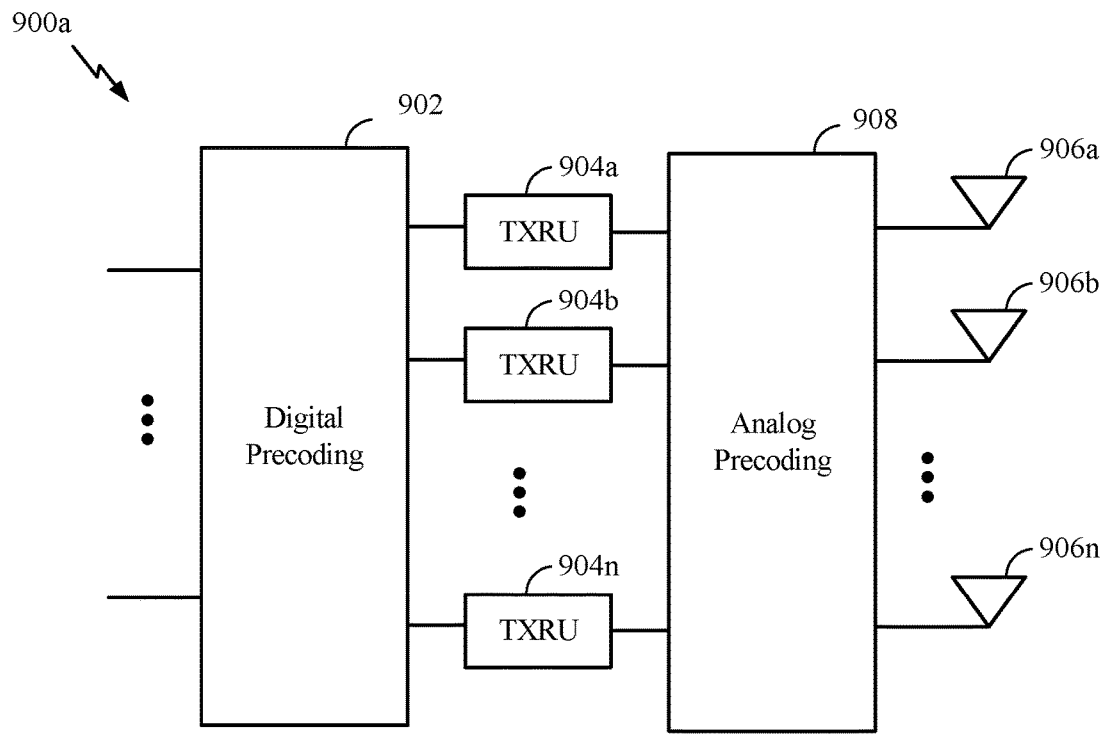
FIG. 9A illustrates an example of hybrid precoding/detecting, in accordance with certain aspects of the present disclosure.
Figure 9B:
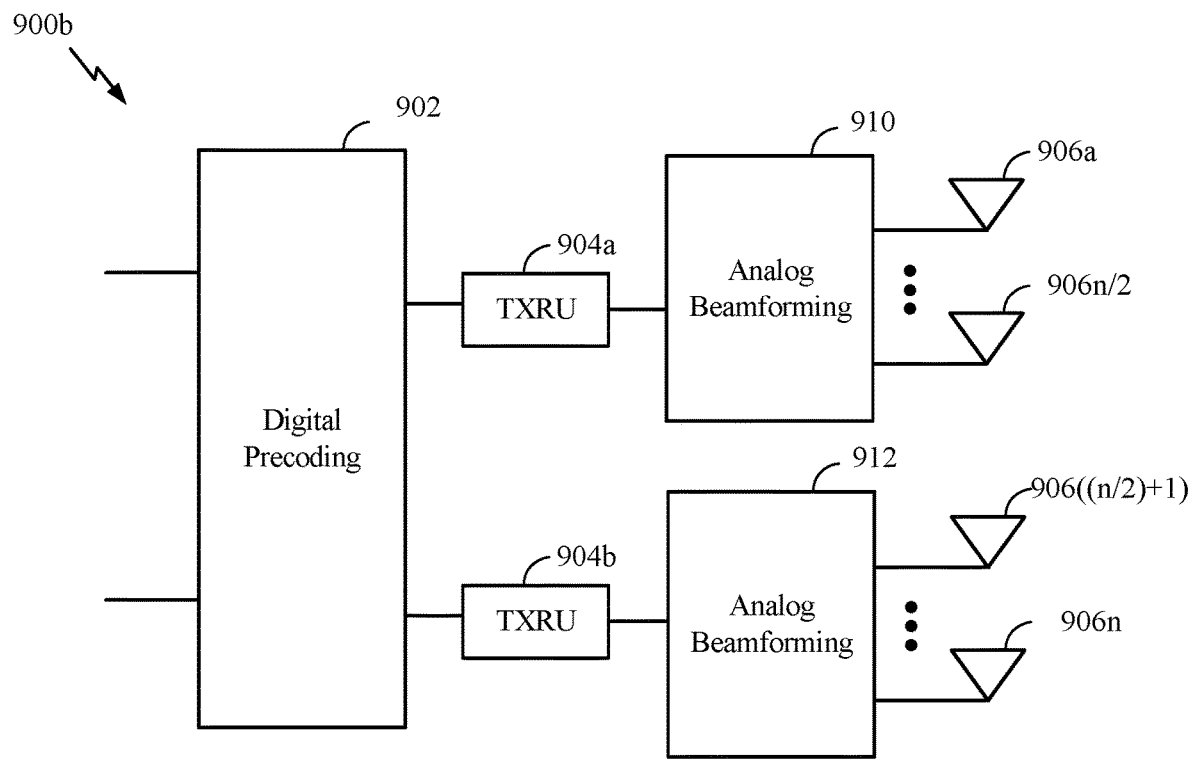
FIG. 9B illustrates an example of hybrid precoding/detecting with analog precoding/detecting (beamforming) per polarization, in accordance with certain aspects of the present disclosure.

As shown in FIG. 9A, hybrid precoding/detecting involves both the analog precoding/detecting 908 (e.g., illustrated in FIG. 7) that combines input from the 906$_{a\ldots n}$ antennas and the digital precoding/detecting (e.g., illustrated in FIG. 8) that has input from the TXRUs 904$_{a\ldots n}$. The hybrid precoding/detecting may use the Type-2 port selection codebook. The Type-2 port selection codebook is not defined by using a DFT matrix. It is implicitly assumed that the DFT feature is already applied to the beamformed CSI-RS port; however, any type of analog precoding/detecting (e.g., analog beamforming) other than the DFT-based beamforming can be applied. The number of support ports may be 4, 8, 12, 16, 24, and 32. Up to 2 layers may be supported. L antenna ports per polarization are selected (e.g., L=2, 3, 4). As shown in FIG. 9B, another example of hybrid precoding/detecting applies analog beamforming per polarization. As shown in FIG. 9B, the hybrid precoding/detecting applied V-pol (vertical polarization) analog precoding/detecting (e.g., analog beamforming) and H-pol (horizontal polarization) analog precoding/detecting (e.g., analog beamforming) with a same QCL Type-D with $N_{ant}/2$ antennas per polarization. The hybrid precoding/detecting uses one RF chain (e.g., beamformed CSI-RS) per polarization. The digital precoding/detecting uses two layers (e.g., DMRS ports). The hybrid precoding/detecting may not use precoding (or Type-1 codebook). The Type-2 port selection codebook may not be applied because the number of ports is two. Instead, the Type-1 codebook defined for 2 ports can be used. In the rank-2 case, no precoding/detecting may be applied (e.g., the identity matrix may be used for the digital precoding/detecting).

According to certain aspects, as discussed in more detail below with respect to FIG. 13, beam management procedures may be optimized in order to leverage benefits of hybrid precoding/detecting for multi-beam operation with only a single TCI state. In some examples, the channel state information reference signal (CSI-RS) for CSI acquisition may be used instead of the CSI-RS for BM. For example, as discussed above, the BS may provide the UE with a CSI report configuration. According to certain aspects, the CSI report configuration configures the codebook for CSI-RS for CSI feedback, to be used for beam management.

CSI may refer to channel properties of a communication link. The CSI may represent the combined effects of, for example, scattering, fading, and power decay with distance between a transmitter and receiver. Channel estimation using pilots, such as CSI-RS, may be performed to determine these effects on the channel. CSI feedback may be used to adapt transmissions based on the current channel conditions, which is useful for achieving reliable communication, in particular, with high data rates in multi-antenna systems. CSI is typically estimated at the receiver (e.g., the UE 120*a*), quantized, and fed back to the transmitter (e.g., the BS 110*a*). The UE may measure the channel associated with CSI for CSI-RS resources. The CSI report configuration may configure the TCI state(s) associated with the CSI-RS resources for the UE to measure.

The CSI report configuration also configures the CSI parameters (sometimes referred to as quantities) to be reported. Three codebooks may include the Type-1 single panel, Type1 multi-panel, and Type-2 single panel. Regardless which codebook is used, the CSI report may include at least the channel quality indicator (CQI), precoding matrix indicator (PMI), CSI-RS resource indicator (CRI), and rank indicator (RI). The structure of the PMI may vary based on the codebook. The CRI, RI, and CQI may be in a first part (Part I) and the PMI may be in a second part (Part II) of the CSI report.

Figure 10:
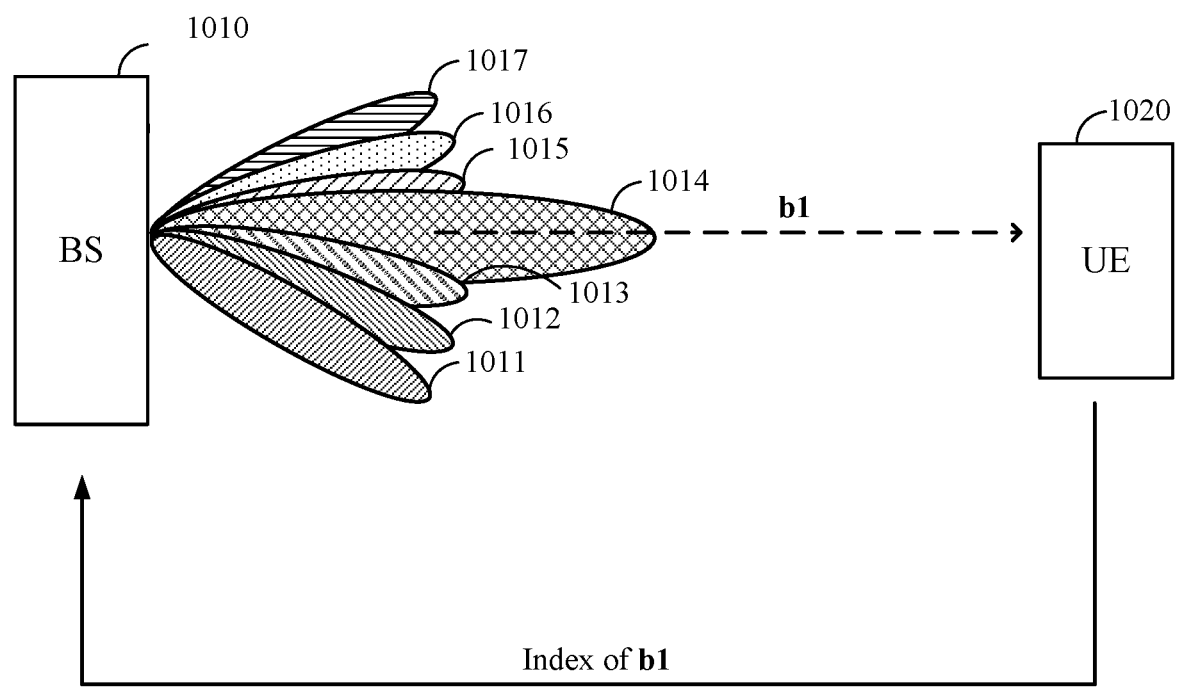
FIG. 10 illustrates example oversampled beams for Type-1 channel state information (CSI) feedback, in accordance with certain aspects of the present disclosure.

For the Type-1 single panel codebook, the PMI may include a W1 matrix (e.g., subset of beams) and a W2 matrix (e.g., phase for cross polarization combination and beam selection). For the Type-1 multi-panel codebook, compared to type-1 single panel codebook, the PMI further comprises a phase for cross panel combination. FIG. 10 illustrates example oversampled beams for Type-1 CSI feedback, in accordance with certain aspects of the present disclosure. As shown in FIG. 10, the BS 1010 has a plurality of TX beams (e.g., TX beams 1011, 1012, . . . , 1017). The UE 1020 can feed back to the BS 1010 an index of a preferred beam $b_1$ (e.g., TX beam 1014) or beams of the candidate beams. For example, the UE 1020 may feed back the precoding vector $w_k$ for the l-th layer and kth subband:

$$w_k = \begin{pmatrix} b_{ijk} \\ \varphi_k \cdot b_{ijk} \end{pmatrix}$$

where b represents the oversampled beam (e.g., discrete Fourier transform (DFT) beam), for both polarizations, and φ is the co-phasing. The oversampled beams DFT beams per polarization ($N_1 N_2 \times 1$ vectors) may be represented as $b_1$, $b_2$, $b_{N_1 O_1 N_2 O_2}$, where $O_1$, $O_2$ is the oversampling factor per dimension (e.g., 1 or 4), and $N_{ant}=2N_1 N_2$ (e.g., if $N_1=2$ and $N_2=4$, then $N_{ant}=16$). For wideband PMI, the UE may report the L strongest beam indexes among all the oversampled DFT beams ($i_0$, . . . , $i_{L-1}$). For subband PMI, the UE may report the best beam index among the L beams ($j_k$) (e.g. when L=4) and the co-phasing coefficient ($\varphi_k$), with the digital precoding $w_k^{BB}$ codebook ($w_k = w_k^{BB}$). For ranks 1 and 2, L={1 or 4} and for ranks 3-8, L=1.

Figure 11:
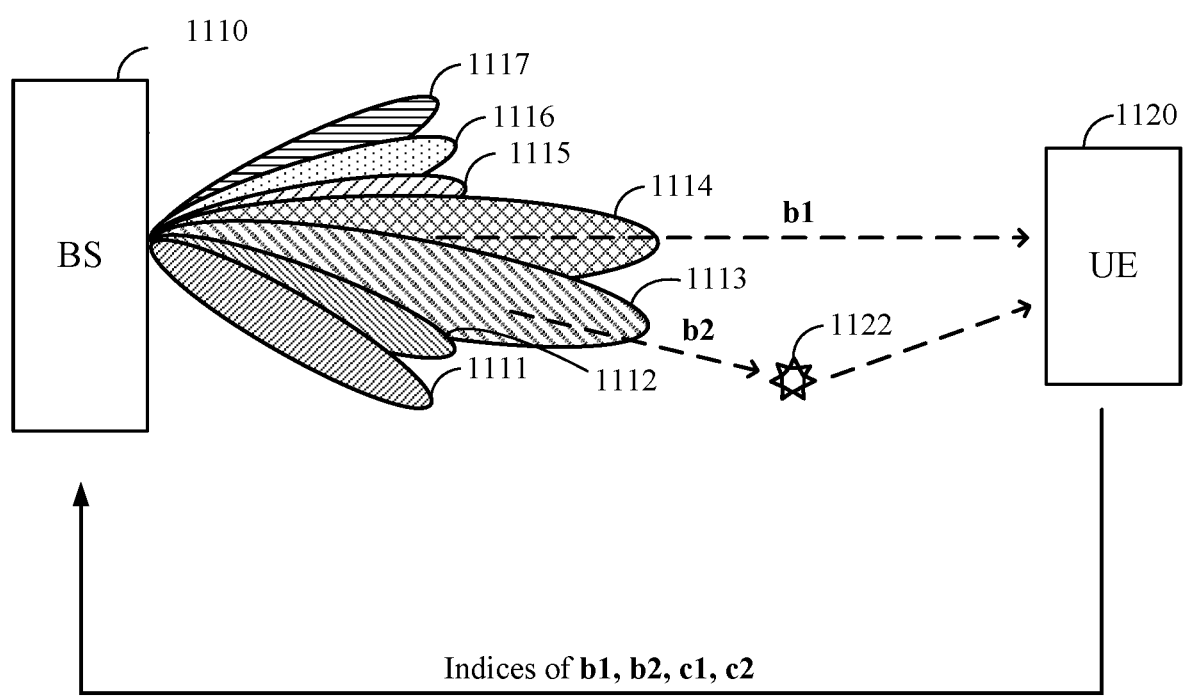
FIG. 11 illustrates example oversampled beams for Type-2 CSI feedback, in accordance with certain aspects of the present disclosure.

For the Type-2 single panel codebook, the PMI is a linear combination of beams; it has a subset of orthogonal beams to be used for linear combination and has per layer, per polarization, amplitude and phase for each beam. As shown in FIG. 11, the preferred beam can be a combination of beams $b_1$ and $b_2$ and associated quantized coefficients $c_1$ and $c_2$ (e.g., $c_1 b_1 + c_2 b_2$), and the UE 1120 can feedback the selected beams and the coefficients to the BS 1110. As shown in FIG. 11, a beam (e.g., the beam $b_2$) may be reflected by an obstruction 1122. The UE 1120 may be configured to report at least a Type-2 precoder across configured frequency domain (FD) units. The UE 1120 may report wideband (WB) PMI and/or subband (SB) PMI as configured. For the WB PMI, the UE 1120 may report the L strongest beam indexes among all the oversampled DFT beams ($i_0$, . . . , $i_{L-1}$) and the WB amplitude coefficients ($p_{pol,layer,i}^{WB}$). For the subband (k) PMI, the UE 1120 may report the SB amplitude coefficients ($p_{pol,layer,i}^{WB}$) and the SB phase coefficients ($\varphi_{pol,layer,i}^{SB(k)}$). Thus, for the precoding at subband k, the UE 1120 may report the precoding vector $w_k$ for the l-th layer for rank-1 as:

$$w_k = \sum_{i=0}^{L-1} \begin{bmatrix} c_{+,l,k} b_{il} \\ c_{-,l,k} b_{il} \end{bmatrix} = \begin{bmatrix} B_L & 0 \\ 0 & B_L \end{bmatrix} \begin{bmatrix} c_{+,1,k} \\ c_{+,2,k} \\ c_{+,3,k} \\ c_{+,4,k} \\ c_{-,1,k} \\ c_{-,2,k} \\ c_{-,3,k} \\ c_{-,4,k} \end{bmatrix}$$

where $B_L = [b_{i\_1}, b_{i\_2}, b_{i\_3}, b_{i\_4}]$, and, $c_{pol,l,k} = p_{pol,R1,i\_l}^{WB} p_{pol,R1,i_l}^{SB(k)} \varphi_{pol,R1,i_l}^{SB(k)}$ is subband phase per polarization, and $b_i$ is the selected beam per polarization, with digital precoding $w_k^{BB}$ codebook ($w_k = w_k^{BB}$).

Figure 12:
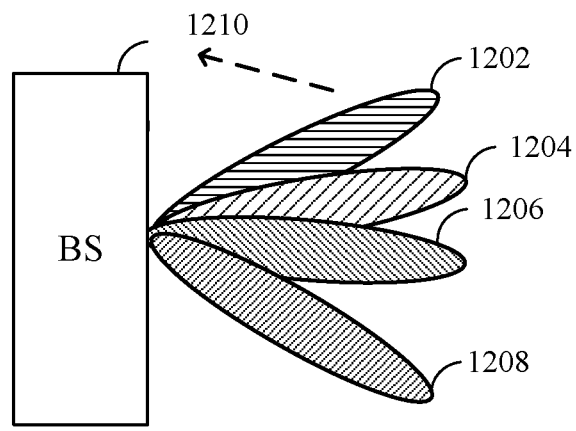
FIG. 12 illustrates example beams for CSI-RS Type-2 port selection, in accordance with certain aspects of the present disclosure.

According to certain aspects, the CSI-RS for Type-2 port selection codebook for CSI may be used during a beam management procedure. FIG. 12 illustrates example oversampled beams for Type-2 CSI port selection, in accordance with certain aspects of the present disclosure. Beams associated with beamformed CSI-RS ports in a given CSI-RS resource may be denoted by $w_1^{RF}$, $w_2^{RF}$, . . . , $$w_{\frac{P_{CSI-RS}}{2}}^{RF},$$

where $P_{CSI-RS}$ is the number of CSI-RS ports. For example, in the example shown in FIG. 12, the number of CSI-RS ports per polarization is $P_{CSI-RS}=4$ and the number of antenna ports per polarization is L=2. For the WB PMI, the UE may report 1) L strongest beam indexes among the beams associated with the given CSI-RS ports ($i_0$, . . . , $i_{L-1}$) and the WB amplitude coefficients ($p_{pol,layer,i}^{WB}$). For the SB PMI, ort t the UE may report SB amplitude coefficients ($p_{pol,layer,i}^{SB(k)}$) and the SB phase coefficients ($\varphi_{pol,layer,i}^{SB(k)}$). Thus, for the precoding at subband k, the UE may report the precoding vector $w_k$ for the l-th layer in the rank-1 case as:

$$w_k = \sum_{i=0}^{L-1} \begin{bmatrix} c_{+,l,k} w_{il}^{RF} \\ c_{-,l,k} w_{il}^{RF} \end{bmatrix} = \begin{bmatrix} w^{RF} & 0 \\ 0 & w^{RF} \end{bmatrix} \begin{bmatrix} 0 \\ c_{+,2,k} \\ c_{+,3,k} \\ 0 \\ 0 \\ c_{-,2,k} \\ c_{-,3,k} \\ 0 \end{bmatrix}$$

where $w^{RF} = [w_1^{RF}, w_2^{RF}, w_3^{RF}, w_4^{RF}]$, and, $c_{pol,l,k} = p_{pol,R1,i\_l}^{WB} p_{pol,R1,i_l}^{SB(k)} \varphi_{pol,R1,i_l}^{SB(k)}$ is subband phase per polarization, and $b_i$ is the selected beam per polarization, with digital precoding $w_k^{BB}$ codebook ($w^{RF} = w_k^{BB}$).

Unlike the CSI-RS for BM codebook discussed above, which allows only 1 or 2 CSI-RS ports, the CSI-RS for Type-2 port selection codebook for CSI allows up to 32 ports to be assigned to a CSI-RS resource. This may allow each port to use a different TX beam.

In certain systems (e.g., Release-15 5G NR systems), repetition is not configured for the CSI-RS for Type-2-port-selection codebook. For the CSI-RS for Type-2 port selection codebook for CSI for the beam management procedures discussed herein, for example in more detail below with respect to the FIG. 13, however, the "repetition" parameter is configured.

In certain systems (e.g., Release-15 5G NR systems), a CSI-RS resource set can have only one CSI-RS resource when the CSI-RS is configured as a CSI-RS for Type-2 port selection codebook. For example, the UE is not expected to be configured with more than one CSI-RS resource in a resource set for channel measurement for a CSI-ReportConfig with the higher layer parameter codebookType set to 'typeII' or to 'typeII-PortSelection'. According to certain aspects of the present disclosure, however, the CSI-RS resource set may have multiple CSI-RS resources when the CSI-RS is configured as a CSI-RS for type-II port selection codebook.

Figure 13:
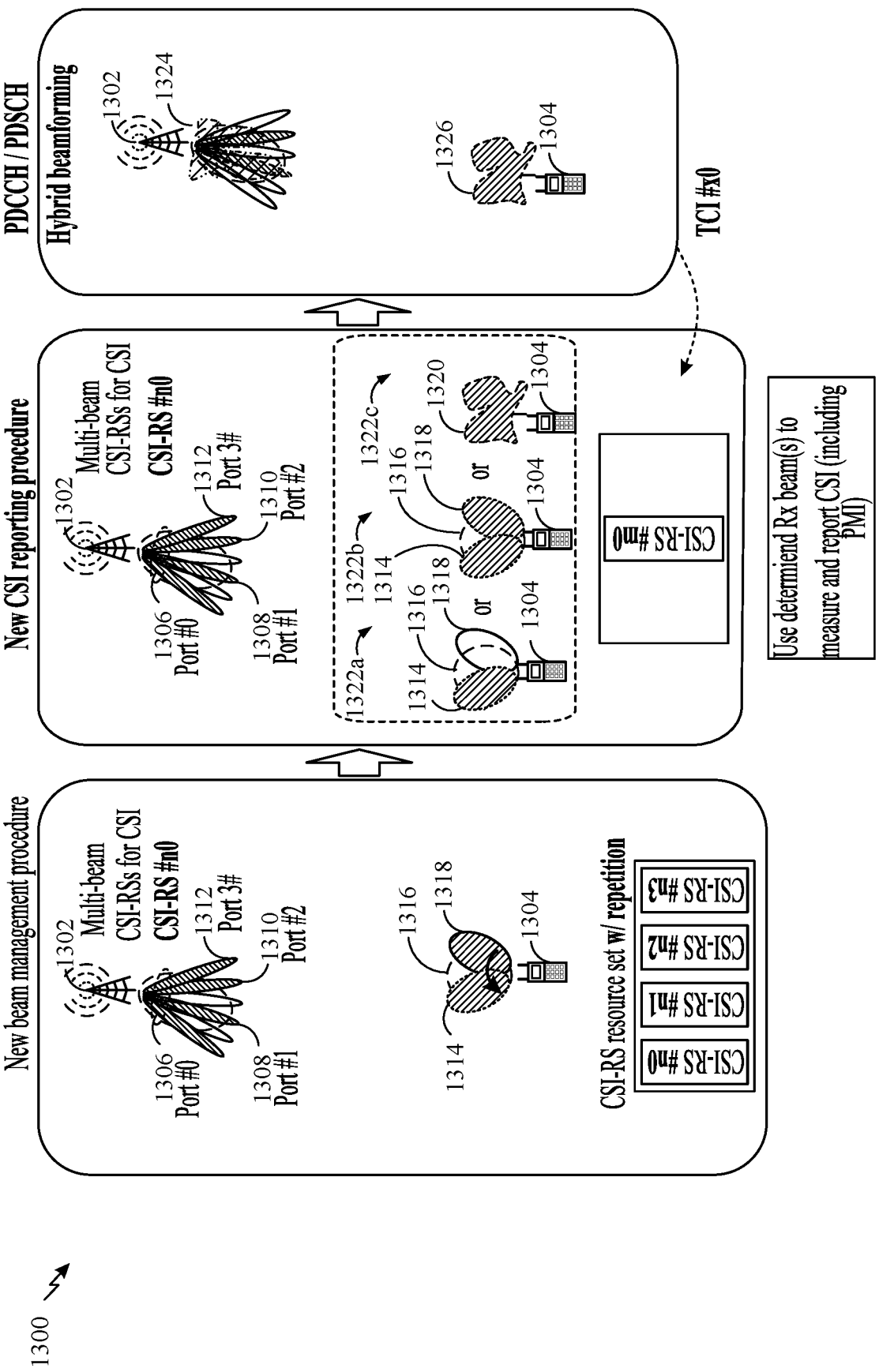
FIG. 13 illustrates an example of beam management procedures and a single TCI-state indication for multi-beam operation, in accordance with certain aspects of the present disclosure.

FIG. 13 illustrates an example of beam management procedures and a single TCI-state indication for multi-beam operation, in accordance with certain aspects of the present disclosure.

Although not shown in FIG. 13, the beam discovery procedure may be performed to determine TX and RX beams (e.g., as described above with respect to FIG. 5). In some examples, the SSBs used for beam discovery procedure (e.g., SSBs #0, #1, #2, #3) are configured with an associated TCI-state for the SSBs.

Additionally, not shown in FIG. 13, after the beam discovery procedure, an optional TX beam refinement procedure may be performed. The optional beam refinement procedure may be used to selected TX beam candidates. In some examples, the optional TX beam refinement procedure may be performed using the CSI-RS for BM. For example, the BS may transmit each CSI-RS using one TX beam (e.g., from the CSI-RS for BM codebook) while the UE receives the CSI-RSs with a fixed receive beam, similar to the TX beam refinement procedure described above with respect to FIG. 5.

According to certain aspects, as shown in FIG. 13, after the beam discovery procedure and/or after the optional TX beam refinement procedure, a new beam management procedure is performed. The new beam management procedure may be a new RX beam refinement procedure. The new beam management procedure uses the CSI-RS for CSI. For the new beam management procedure, the BS 1302 transmits multiple TX beams per CSI-RS with repetition. By using multiple RF chains, the BS sends a CSI-RS with multiple ports that are transmitted with different TX beams simultaneously. For example, as shown in FIG. 13, the BS 1302 repeats the CSI-RS #n, each repetition (CSI-RS #n0, #n1, #n2, #n3) uses the same set of multiple beams (e.g., identical beam sets 1306, 1308, 1310, 1313 using the ports #0, #1, #2, #3, respectively).

For each CSI-RS repetition using the set BS TX beams, the UE 1304 can sweep with its RX beams 1313, 1316, 1318. In the case that the optional TX beam refinement procedure is performed, the set of TX beams may be the TX beams determined during the optional TX beam refinement procedure. By using the repeated CSI-RS transmissions during the new beam management procedure, the UE can determine the best RX beam(s) (e.g., strongest beams, beams having a highest signal quality measurement, or beams having a signal quality measurement above a threshold) for each of the multi-beam CSI-RS transmissions. In some examples, the CSI-RSs used for the new beam management procedure (e.g., the CSI-RS resource set with CSI-RSs #n0, #n1, #n2, #n3) is configured with an associated TCI-state for the CSI-RS, for example, pointing to the TX beams.

According to certain aspects, as shown in FIG. 13, after the new beam management procedure, a new CSI reporting procedure may be performed. The new CSI reporting procedure uses the CSI-RS for CSI. For the new CSI reporting procedure, the BS 1302 transmits multiple TX beams (e.g., simultaneously with the determined TX ports) per CSI-RS (e.g., multi-beam CSI-RS), but without repetition. Using the determined RX beams from the new beam management procedure, the UE 1304 can measure the multi-beam CSI-RS transmission (e.g., CSI-RS #m0) to determine the CSI feedback (e.g., PMI, CQI, etc.) for reporting to the BS 1302. In some examples, the CSI-RS used for the CSI report procedure (e.g., CSI-RS #m0) is configured with an associated TCI-state for the CSI-RS, for example, pointing to the TX beams used in the new beam management procedure. In some examples, the CSI report procedure effectively also includes a TX beam refinement procedure because the UE provides CSI feedback for the TX beams, and the BS can select (e.g., based on the PMI report) a subset of the beams (e.g., the best TX beams) to actually use for the PDSCH transmission. In some examples, even when the candidate beam set has more TX beams (e.g., four TX beams as shown in the CSI report procedure in FIG. 13), the UE can select a subset of the beams (e.g., two TX beams) when reporting a PMI. According to certain aspects, as shown in FIG. 13, how to determine the RX beam(s) may be based on whether the UE includes one RF chain at the UE (e.g., a single RX beam vector is selected within a predefined analog beamforming codebook, as shown in the scenario 1322*a*, or a beam 1320 determined based on per-antenna element phase control without using analog beamforming codebook as shown in the scenario 1322*c*, or whether the UE has multiple RF chains at the UE (e.g., a single RX beam is determined per chain) as shown in the scenario 1322*b*.

According to certain aspects, after the new CSI reporting procedure, the UE 1304 may receive an indication of a single TCI state for a multi-beam PDSCH transmission. For example, the UE 1304 may receive DCI (e.g., in a physical downlink control channel (PDCCH)) with an indication (e.g., a 3-bit indicator) of the TCI state. In some examples, the TCI state may point to the TCI state associated with the multi-beam CSI-RS in the CSI report procedure (e.g., TCI #x1 associated with the CSI-RS #m0 in the example in FIG. 13). As discussed above, in some examples, the TCI state is associated with a preconfigured quasi-colocation (QCL) relation for the multi-beam CSI-RS and PDSCH by RRC and/or medium access control control element (MAC-CE) signaling. Based on the TCI-state, the UE 1304 can determine the UE RX beam(s) 1320 corresponding to the indicated multi-beam CSI-RS to apply for the analog precoding/detecting (e.g., analog beamforming). The UE can apply demodulation reference signals (DMRS) for the digital detecting. Based on the analog and digital detecting, the UE 1304 can perform the hybrid detecting 1326 to receive and demodulate the multi-beam PDSCH. The BS 1302 can use the TX beams, or a subset of the TX beams, from the new CSI reporting procedure to determine the analog precoding/detecting (e.g., analog beamforming) and the BS 1302 can use the PMI to determine the digital precoding. Based on the analog and digital precoding, the BS 1302 can perform the hybrid precoding 1324 to transmit the multi-beam PDSCH.

Figure 14:
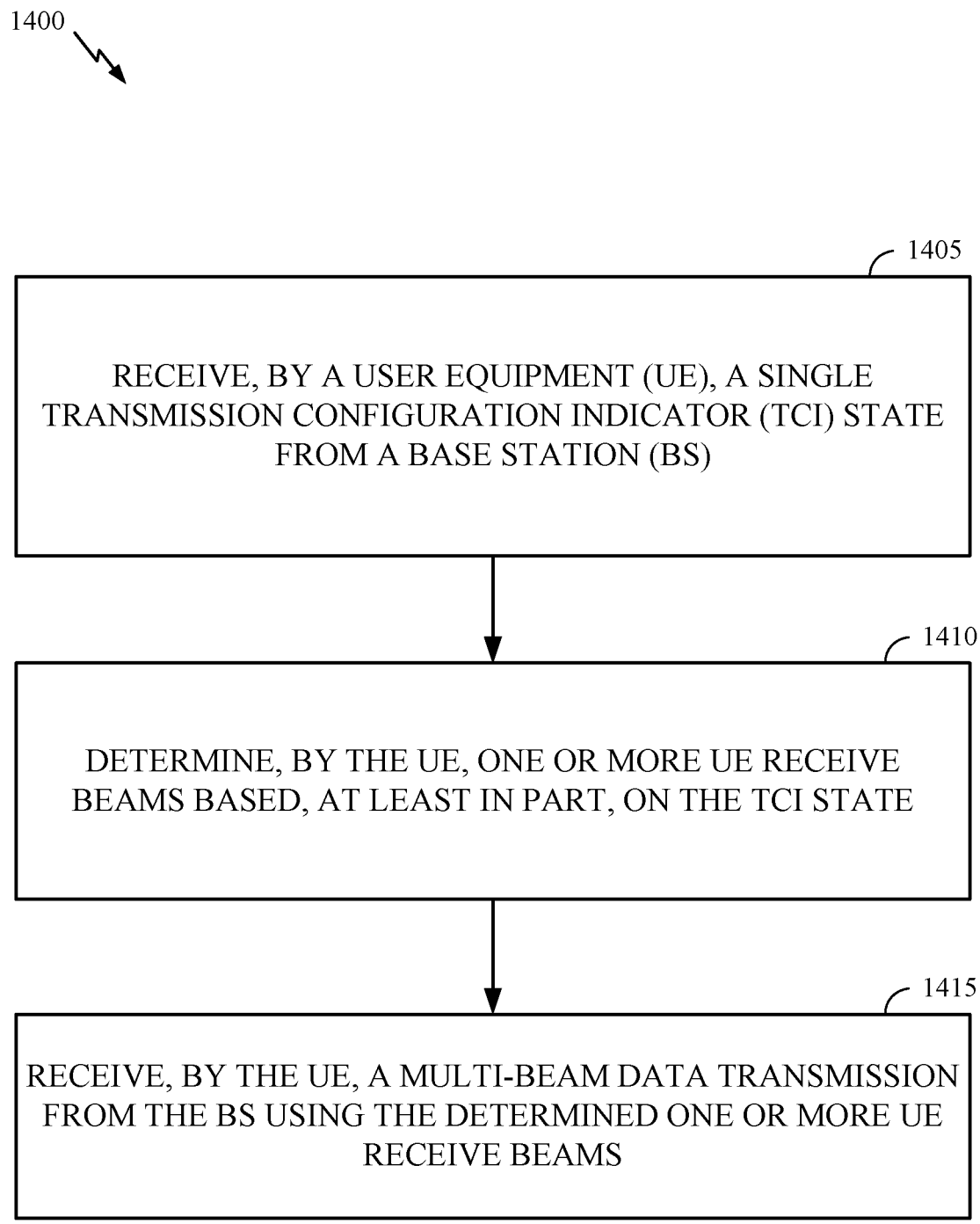
FIG. 14 is a flow diagram illustrating example operations for wireless communication by a UE, in accordance with certain aspects of the present disclosure.

FIG. 14 is a flow diagram illustrating example operations 1400 for wireless communication, in accordance with certain aspects of the present disclosure. The operations 1400 may be performed, for example, by UE (e.g., such as a UE 120*a* in the wireless communication network 100). Operations 1400 may be implemented as software components that are executed and run on one or more processors (e.g., controller/processor 280 of FIG. 2). Further, the transmission and reception of signals by the UE in operations 1400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1400 may begin, at 1405, by receiving a single TCI state from a BS.

At 1410, the UE determines one or more UE receive beams based, at least in part, on the TCI state.

At 1415, the UE receiving a multi-beam (e.g., multiple simultaneous BS TX beams) data transmission (e.g., a PDSCH) from the BS using the determined one or more UE receive beams.

According to certain aspects, the operations 1400 may include performing one or more beam management procedures. In some examples, the beam management may (e.g., a new beam refinement procedure) include measuring a plurality of repetitions of a reference signals (e.g., CSI-RS) from the BS using a plurality of UE receive beams, each of the repetitions transmitted via a first set of a plurality of BS transmit beams (e.g., each repetition is transmitted by the BS with multiple TX beams using multiple ports simultaneously) and determining one or more preferred UE receive beams, of the plurality of UE receive beams, based on the measurements.

In some examples, the beam management procedures (e.g., a CSI report procedure) may include measuring another RS (e.g., a CSI-RS) from the BS using the one or more preferred UE receive beams, the another RS associated with the first set of BS transmit beams and reporting CSI to the BS based on the measurement, the CSI includes at least PMI feedback. In this case, the TCI state may indicate the another RS (e.g., the TCI state points to the CSI-RS and the associated BS TX beams used in the CSI report procedure). The UE may determine the one or more UE receive beams, at 1410, based at least in part on the TCI state by determining the one or more preferred UE receive beams associated with the another RS indicated by the TCI state. In some examples, the UE may report the CSI for only a subset of the set of BS transmit beams.

According to certain aspects, determining one or more UE receive beams at 1410, based, at least in part, on the TCI state includes determining analog detecting (e.g., beamforming) based on the one or more preferred UE receive beams associated with the TCI state; determining digital detecting based on one or more DMRS associated with the multi-beam data transmission; and determining one or more hybrid beamforming UE receive beams based on the analog detecting and the digital detecting.

According to certain aspects, determining one or more UE receive beams at 1410, includes selecting one or more UE receive beams in a predefined beam codebook or generating one or more UE receive beams without using a predefined beam codebook.

According to certain aspects, performing the one or more beam management procedures further includes (e.g., for an optional TX beam refinement procedure) measuring a plurality of RSs from the BS, each of the RSs associated with a different BS transmit beam; and determining a plurality of preferred BS transmit beams based on the measurements. In this case, the first set of BS transmit beams may be the plurality of preferred BS transmit beams.

According to certain aspects, the operations 1400 may include receiving a CSI configuration for the one or more beam management procedure. The CSI configuration may configure the UE with at least one CSI-RS resource set. Each CSI-RS resource set may include one or more CSI-RS resources comprising a number of available ports, wherein the RS from the BS comprises CSI-RS, and wherein the measuring the plurality of repetitions of the RS comprises measuring each CSI-RS using the CSI-RS resources in a CSI-RS resource set. In some examples, the CSI configuration configures CSI-RS for CSI acquisition (e.g., CSI-RS for CM). In some examples, the CSI configuration configures a CSI-RS for type-II port selection codebook. In some examples, at least one CSI-RS resource is configured with a plurality of ports, each port associated with a different BS transmit beam for a CSI-RS. In some examples, at least one of the CSI-RS resource sets is configured with a plurality of CSI-RS resources. In some examples, for each of the CSI-RS resource sets, the CSI configuration indicates whether CSI-RS repetition is configured.

Figure 15:
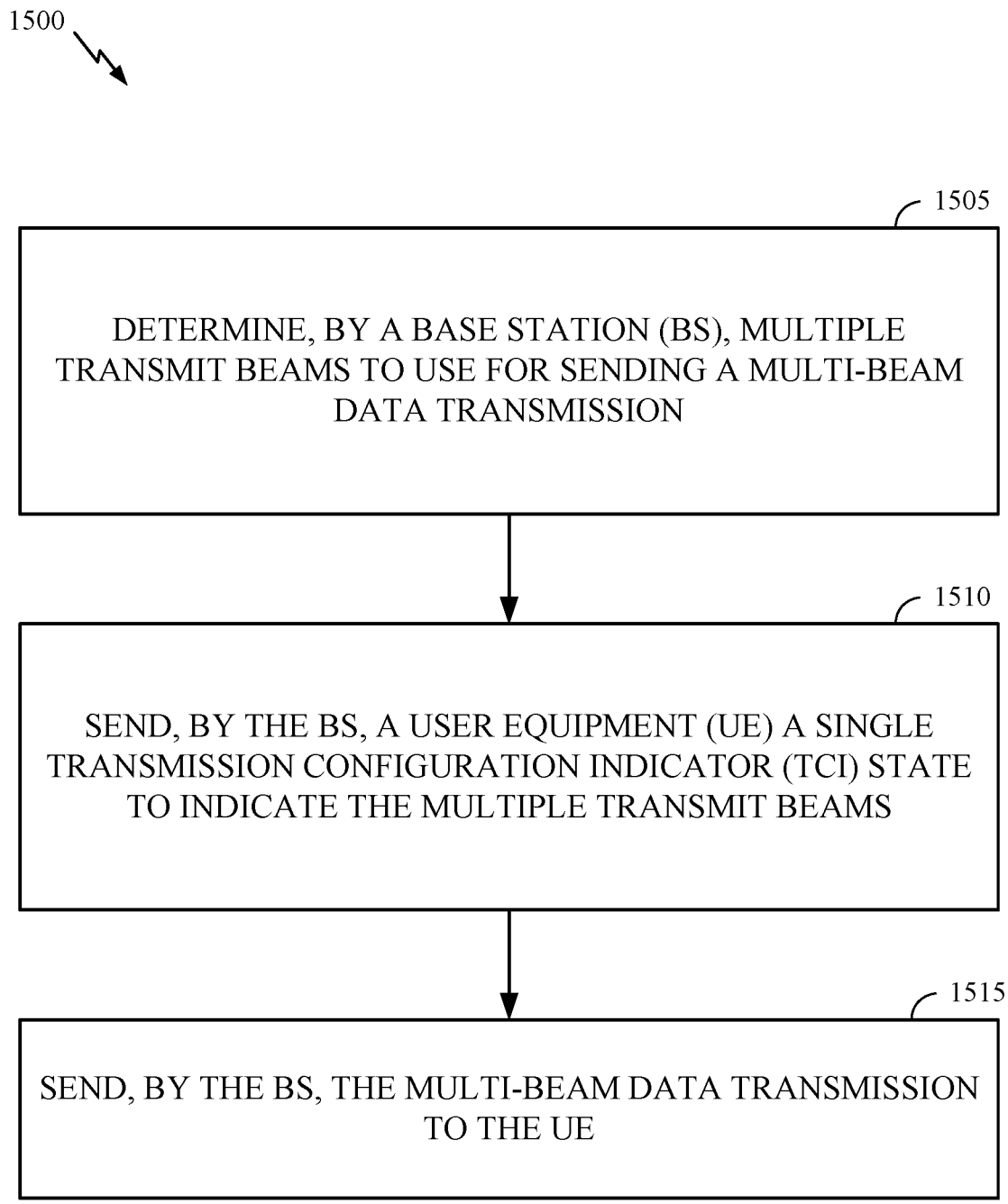
FIG. 15 is a flow diagram illustrating example operations for wireless communication by a BS, in accordance with certain aspects of the present disclosure.

FIG. 15 is a flow diagram illustrating example operations 1500 for wireless communication, in accordance with certain aspects of the present disclosure. The operations 1500 may be performed, for example, by a BS (e.g., such as a BS 110a in the wireless communication network 100). The operations 1500 may be complimentary operations by the BS 110a to the operations 1400 performed by the UE 120a. Operations 1500 may be implemented as software components that are executed and run on one or more processors (e.g., controller/processor 230 of FIG. 2). Further, the transmission and reception of signals by the BS in operations 1500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1500 may begin, at 1505, by determining multiple transmit beams to use for sending a multi-beam data transmission.

At 1510, the BS sends a UE a single TCI state to indicate the multiple transmit beams.

At 1515, the BS sends the multi-beam data transmission (e.g., a PDSCH) to the UE.

According to certain aspects, the operations 1500 include performing one or more beam management procedures with the UE including sending a plurality of repetitions of a RS to the UE, each repetition transmitted using a first set of BS transmit beams.

In some examples, performing the one or more beam management procedures with the UE further includes sending another RS to the UE using the first set of BS transmit beams, wherein the TCI indicates the another RS and receiving CSI from the UE, the CSI including at least PMI feedback. In some examples, the CSI may include CSI for only a subset of the first set of BS transmit beams.

According to certain aspects, the operations 1500 include determining a plurality of BS transmit beams to use for the multi-beam data transmission to the UE based, at least in part, on the PMI feedback. In some examples, determining the plurality of BS transmit beams to use for the multi-beam data transmission to the UE includes determining analog precoding based on the first set of BS transmit beams; determining digital precoding based on the PMI; and determining one or more hybrid beamforming BS transmit beams based on the analog precoding and the digital precoding.

In some examples, performing the one or more beam management procedures with the UE further includes sending a plurality of RSs to the UE, each of the RSs associated with a different BS transmit beam and receiving an indication from the UE of a plurality of preferred BS transmit beams. In this case, the first set of BS transmit beams may include the plurality of preferred BS transmit beams.

According to certain aspects, the operations 1500 include sending the UE a CSI configuration for the one or more beam management procedures. The CSI configuration may configure the UE with at least one CSI-RS resource set. Each CSI-RS resource set may include one or more CSI resources configured with a number of available ports. In this case, the RS is the CSI-RS. The CSI configuration may configured CSI-RS for CSI acquisition. The CSI configuration may configure a CSI-RS for type-II port selection codebook. At least one CSI-RS resource may be configured with a plurality of ports, each port associated with a different BS transmit beam for a CSI-RS. At least one of the CSI-RS resource sets may be configured with a plurality of CSI-RS resources. For each of the CSI-RS resource sets, the CSI configuration may indicate whether CSI-RS repetition is configured.

Thus, the UE and BS can perform multi-operation efficiently with only a single TCI state.

Figure 16:
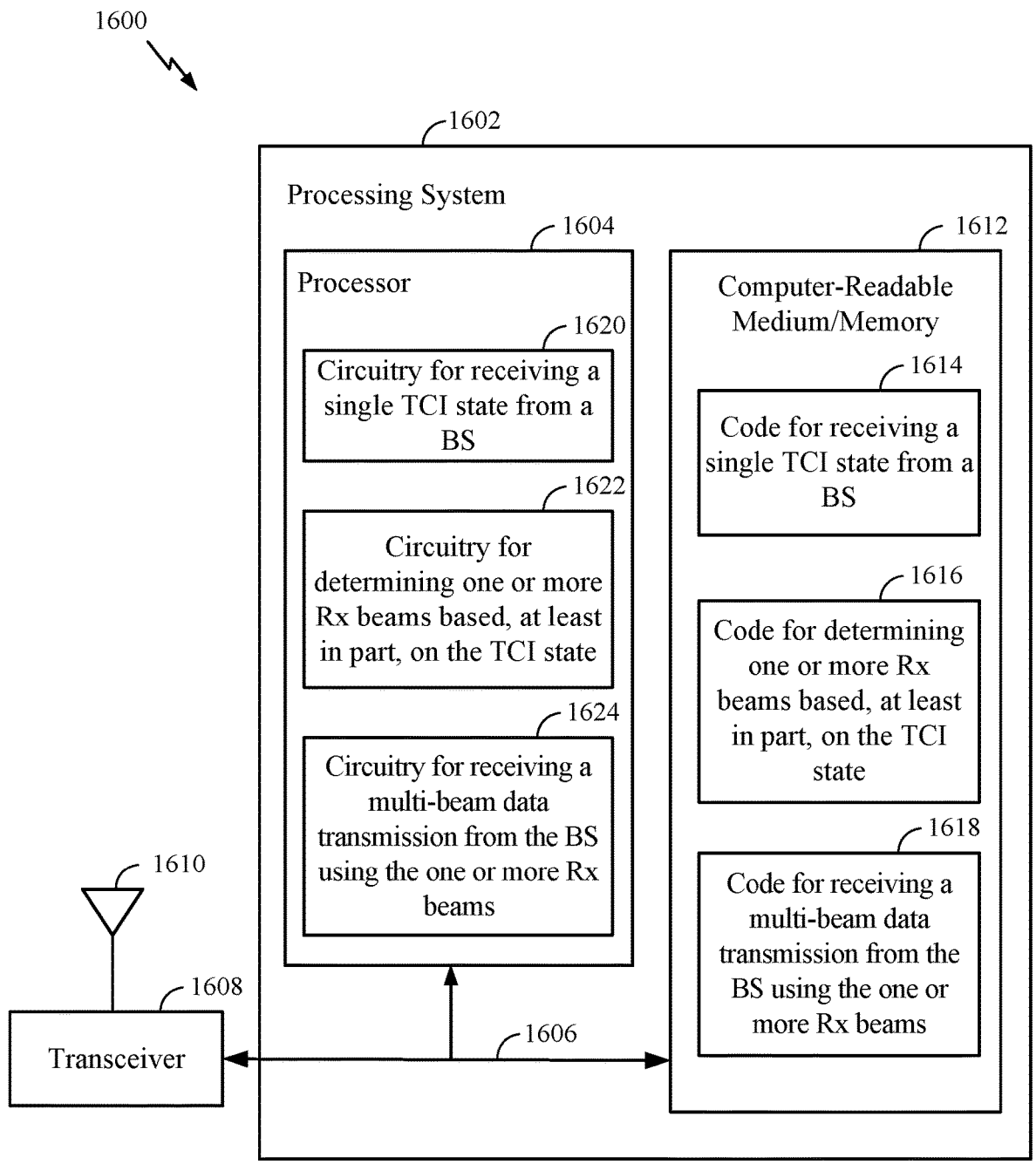
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein for multi-beam operation with a single TCI state, such as the operations illustrated in FIG. 14. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 14, or other operations for performing the various techniques discussed herein for multi-operation with a single TCI state. In certain aspects, computer-readable medium/memory 1612 stores code 1614 for receiving a single TCI state from a BS, in accordance with certain aspects of the present disclosure; code 1616 for determining one or more UE RX beams based, at least in part, on the TCI state, in accordance with certain aspects of the present disclosure; and code 1618 for receiving a multi-beam data transmission from the BS using the one or more UE RX beams, in accordance with certain aspects of the present disclosure. In certain aspects, the processor 1604 has circuitry configured to implement the code stored in the computer-readable medium/memory 1612. The processor 1604 includes circuitry 1620 for receiving a single TCI state from a BS; circuitry 1622 for determining one or more UE RX beams based, at least in part, on the TCI state; and circuitry 1624 for receiving a multi-beam data transmission from the BS using the one or more UE RX beams.

Figure 17:
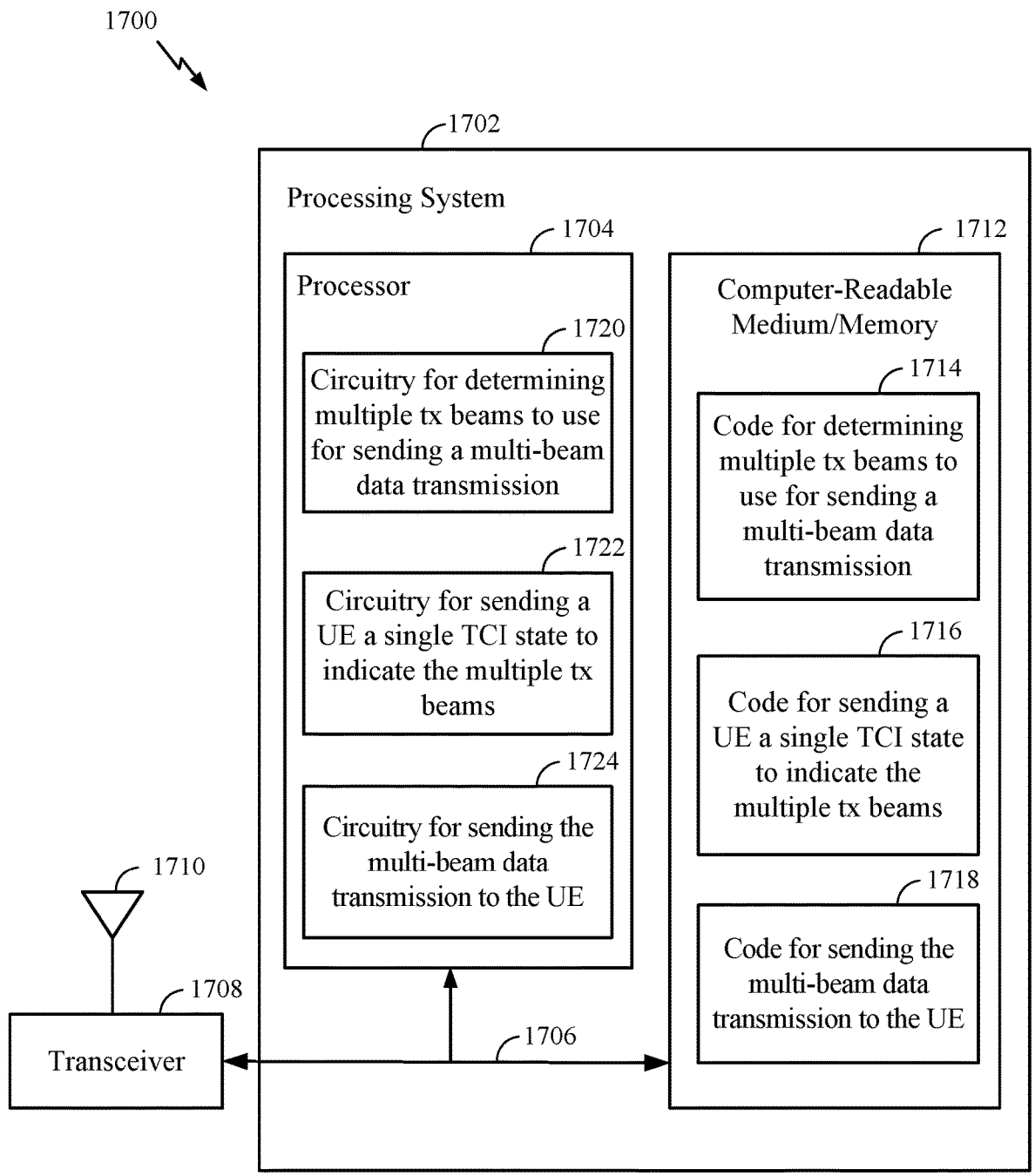
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein for multi-beam operation with a single TCI state, such as the operations illustrated in FIG. 15. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1512 is configured to store instructions (e.g., computer-executable code) that when executed by the processor 1704, cause the processor 1704 to perform the operations illustrated in FIG. 15, or other operations for performing the various techniques discussed herein for multi-beam operation with a single TCI state. In certain aspects, computer-readable medium/memory 1712 stores code 1714 for determining multiple transmit beams to use for a multi-beam data transmission, in accordance with certain aspects of the present disclosure; code 1716 for sending a single TCI state to a UE to indicate the multiple transmit beams, in accordance with certain aspects of the present disclosure; and/or code 1718 for sending the multi-beam data transmission to the UE, in accordance with certain aspects of the present disclosure. In certain aspects, the processor 1704 has circuitry configured to implement the code stored in the computer-readable medium/memory 1712. The processor 1704 includes circuitry 1720 for determining multiple transmit beams to use for a multi-beam data transmission; circuitry 1722 for sending a single TCI state to a UE to indicate the multiple transmit beams; and circuitry 1524 for sending the multi-beam data transmission to the UE.

Example Aspects

In a first aspect, a method for wireless communication by a user equipment (UE) includes receiving a single transmission configuration indicator (TCI) state from a base station (BS); determining one or more UE receive beams based, at least in part, on the TCI state; and receiving a multi-beam data transmission from the BS using the determined one or more UE receive beams.

In a second aspect, in combination with the first aspect, the UE performs one or more beam management procedures including: measuring a plurality of repetitions of a reference signal (RS) from the BS using a plurality of UE receive beams, each of the repetitions transmitted via a first set of a plurality of BS transmit beams; and determining one or more preferred UE receive beams, of the plurality of UE receive beams, based on the measurements.

In a third aspect, in combination with the second aspect, performing the one or more beam management procedures further includes: measuring another RS from the BS using the one or more preferred UE receive beams, the another RS associated with the first set of BS transmit beams; and reporting channel state information (CSI) to the BS based on the measurement, and wherein: the CSI includes at least precoding matrix indicator (PMI) feedback; the TCI state indicates the another RS; and the determining the one or more UE receive beams based, at least in part, on the TCI state includes determining the one or more preferred UE receive beams associated with the another RS indicated by the TCI state.

In a fourth aspect, in combination with the third aspect, reporting the CSI to the BS includes reporting the CSI for only a subset of the set of BS transmit beams.

In a fifth aspect, in combination with one or more of the third and fourth aspects, determining the one or more UE receive beams based, at least in part, on the TCI state includes: determining analog detecting based on the one or more preferred UE receive beams associated with the TCI state; determining digital detecting based on one or more demodulation reference signals (DMRS) associated with the multi-beam data transmission; and determining one or more hybrid detecting UE receive beams based on the analog detecting and the digital detecting.

In a sixth aspect, in combination with one or more of the second through fifth aspects, determining the one or more preferred UE receive beams includes selecting one or more UE receive beams from a predefined beam codebook or generating one or more UE receive beams without using a predefined beam codebook.

In a seventh aspect, in combination with one or more of the second through sixth aspects, performing the one or more beam management procedures further includes: measuring a plurality of RSs from the BS, each of the RSs associated with a different BS transmit beam; and determining a plurality of preferred BS transmit beams based on the measurements, and wherein the first set of BS transmit beams comprises the plurality of preferred BS transmit beams.

In an eighth aspect, in combination with one or more of the second through seventh aspects, the UE receives a channel state information (CSI) configuration for the one or more beam management procedures. The CSI configuration configures the UE with at least one CSI reference signal (CSI-RS) resource set. Each CSI-RS resource set includes one or more CSI-RS resources comprising a number of available ports. The RS from the BS is a CSI-RS. Measuring the plurality of repetitions of the RS includes measuring each CSI-RS using the CSI-RS resources in a CSI-RS resource set.

In a ninth aspect, in combination with the eighth aspect, the CSI configuration configures CSI-RS for a type-II port selection codebook.

In a tenth aspect, in combination with the ninth aspect, the UE is restricted to selecting only adjacent beams.

In an eleventh aspect, in combination with one or more of the eighth through tenth aspects, at least one CSI-RS resource includes a plurality of ports. Each port is associated with a different BS transmit beam for CSI-RS.

In a twelfth aspect, in combination with one or more of the eighth through eleventh aspects, at least one of the CSI-RS resource sets includes a plurality of CSI-RS resources.

In a thirteenth aspect, in combination with one or more of the eighth through twelfth aspects, for each of the CSI-RS resource sets, the CSI configuration indicates whether CSI-RS repetition is configured.

In a fourteenth aspect, a method for wireless communication by a base station (BS) includes determining multiple transmit beams to use for sending a multi-beam data transmission; sending a user equipment (UE) a single transmission configuration indicator (TCI) state to indicate the multiple transmit beams; and sending the multi-beam data transmission to the UE.

In a fifteenth aspect, in combination with the fourteenth aspect, the BS performs one or more beam management procedures with the UE including sending a plurality of repetitions of a reference signal (RS) to the UE. Each repetition is transmitted using a first set of BS transmit beams.

In a sixteenth aspect, in combination with the fifteenth aspect, performing the one or more beam management procedures with the UE further includes: sending another RS to the UE using the first set of BS transmit beams, wherein the TCI indicates the another RS; and receiving channel state information (CSI) from the UE, and wherein the CSI includes at least precoding matrix indicator (PMI) feedback.

In a seventeenth aspect, in combination with the sixteenth aspect, the CSI includes CSI for only a subset of the first set of BS transmit beams.

In an eighteenth aspect, in combination with one or more of the sixteenth and seventeenth aspects, the BS determines a plurality of BS transmit beams to use for the multi-beam data transmission to the UE based, at least in part, on the PMI feedback.

In a nineteenth aspect, in combination with the eighteenth aspect, determining the plurality of BS transmit beams to use for the multi-beam data transmission to the UE includes determining analog precoding based on the first set of BS transmit beams; determining digital precoding based on the PMI; and determining one or more hybrid beamforming BS transmit beams based on the analog precoding and the digital precoding.

In a twentieth aspect, in combination with one or more of the fifteenth through nineteenth aspects, performing the one or more beam management procedures with the UE further includes: sending a plurality of RSs to the UE, each of the RSs associated with a different BS transmit beam; and receiving an indication from the UE of a plurality of preferred BS transmit beams, and wherein the first set of BS transmit beams comprises the plurality of preferred BS transmit beams.

In a twenty-first aspect, in combination with one or more of the fifteenth through twentieth aspects, the BS sends the UE a channel state information (CSI) configuration for the one or more beam management procedures. The CSI configuration configuring the UE with at least one CSI reference signal (CSI-RS) resource set. Each CSI-RS resource set includes one or more CSI resources comprising a number of available ports. The RS is a CSI-RS.

In a twenty-second aspect, in combination with the twenty-first aspect, the CSI configuration configures CSI-RS for a type-II port selection codebook.

In a twenty-third aspect, in combination with one or more of the twenty-first and twenty-second aspects, at least one CSI-RS resource includes a plurality of ports. Each port is associated with a different BS transmit beam for CSI-RS.

In a twenty-fourth aspect, in combination with one or more of the twenty-first through twenty-third aspects, at least one of the CSI-RS resource sets includes a plurality of CSI-RS resources.

In a twenty-fifth aspect, in combination with one or more of the twenty-first through twenty-fourth aspects, for each of the CSI-RS resource sets, the CSI configuration indicates whether CSI-RS repetition is configured.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 14 and/or FIG. 15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
    receiving a single transmission configuration indicator (TCI) state from a base station (BS);
    determining two or more UE receive beams based, at least in part, on the received single TCI state; and
    receiving a multi-beam data transmission from the BS using the determined two or more UE receive beams.

2. The method of claim 1, further comprising performing one or more beam management procedures including:
    measuring a plurality of repetitions of a reference signal (RS) from the BS using a plurality of UE receive beams, each of the repetitions transmitted via a first set of a plurality of BS transmit beams; and
    determining one or more preferred UE receive beams, of the plurality of UE receive beams, based on the measured plurality of repetitions.

3. The method of claim 2, wherein the performing the one or more beam management procedures further includes:
    measuring another RS from the BS using the one or more preferred UE receive beams, the other RS associated with the first set of BS transmit beams; and
    reporting channel state information (CSI) to the BS based on the measurement, and wherein:
        the CSI includes at least precoding matrix indicator (PMI) feedback;
        the single TCI state indicates the other RS; and
        the determining the two or more UE receive beams based, at least in part, on the single TCI state comprises determining the one or more preferred UE receive beams associated with the other RS indicated by the single TCI state.

4. The method of claim 3, wherein the reporting the CSI to the BS comprises reporting the CSI for only a subset of the first set of BS transmit beams.

5. The method of claim 3, wherein the determining the two or more UE receive beams based, at least in part, on the single TCI state includes:
    determining analog detecting based on the one or more preferred UE receive beams associated with the single TCI state;
    determining digital detecting based on one or more demodulation reference signals (DMRS) associated with the multi-beam data transmission; and
    determining one or more hybrid detecting UE receive beams based on the analog detecting and the digital detecting.

6. The method of claim 2, wherein the determining the one or more preferred UE receive beams comprises selecting one or more UE receive beams from a predefined beam codebook or generating one or more UE receive beams without using a predefined beam codebook.

7. The method of claim 2, wherein the performing the one or more beam management procedures further includes:
    measuring a plurality of RSs from the BS, each of the RSs associated with a different BS transmit beam; and
    determining a plurality of preferred BS transmit beams based on the measurements, and wherein the first set of BS transmit beams comprises the plurality of preferred BS transmit beams.

8. The method of claim 2, further comprising receiving a channel state information (CSI) configuration for the one or more beam management procedures, the CSI configuration configuring the UE with at least one CSI reference signal (CSI-RS) resource set, each CSI-RS resource set including one or more CSI-RS resources comprising a number of available ports, wherein the RS from the BS comprises CSI-RS, and wherein the measuring the plurality of repetitions of the RS comprises measuring each CSI-RS using the CSI-RS resources in a CSI-RS resource set.

9. The method of claim 8, wherein the CSI configuration configures CSI-RS for a type-II port selection codebook.

10. The method of claim 9, wherein the UE is restricted to selecting only adjacent beams.

11. The method of claim 8, wherein at least one CSI-RS resource comprises a plurality of ports, each port associated with a different BS transmit beam for CSI-RS.

12. The method of claim 8, wherein at least one of the CSI-RS resource sets comprises a plurality of CSI-RS resources.

13. The method of claim 8, wherein, for each of the CSI-RS resource sets, the CSI configuration indicates whether CSI-RS repetition is configured.

14. A method for wireless communication by a base station (BS), the method comprising:
  determining multiple transmit beams to use for sending a multi-beam data transmission;
  sending, to a user equipment (UE), a single transmission configuration indicator (TCI) state to indicate the multiple transmit beams; and
  sending the multi-beam data transmission to the UE based on the single TCI state.

15. The method of claim 14, further comprising performing one or more beam management procedures with the UE including sending a plurality of repetitions of a reference signal (RS) to the UE, each repetition transmitted using a first set of BS transmit beams.

16. The method of claim 15, wherein the performing the one or more beam management procedures with the UE further includes:
  sending another RS to the UE using the first set of BS transmit beams, wherein the TCI indicates the other RS; and
  receiving channel state information (CSI) from the UE, and wherein the CSI includes at least a precoding matrix indicator (PMI) feedback.

17. The method of claim 16, wherein the CSI comprises CSI for only a subset of the first set of BS transmit beams.

18. The method of claim 16, further comprising determining a plurality of BS transmit beams to use for the multi-beam data transmission to the UE based, at least in part, on the PMI feedback.

19. The method of claim 18, wherein the determining the plurality of BS transmit beams to use for the multi-beam data transmission to the UE comprises:
  determining analog precoding based on the first set of BS transmit beams;
  determining digital precoding based on the PMI feedback; and
  determining one or more hybrid beamforming BS transmit beams based on the analog precoding and the digital precoding.

20. The method of claim 15, wherein the performing the one or more beam management procedures with the UE further includes:
  sending a plurality of RSs to the UE, each of the RSs associated with a different BS transmit beam; and
  receiving an indication from the UE of a plurality of preferred BS transmit beams, and wherein the first set of BS transmit beams comprises the plurality of preferred BS transmit beams.

21. The method of claim 15, further comprising sending the UE a channel state information (CSI) configuration for the one or more beam management procedures, the CSI configuration configuring the UE with at least one CSI reference signal (CSI-RS) resource set, each CSI-RS resource set including one or more CSI resources comprising a number of available ports, wherein the RS comprises CSI-RS.

22. The method of claim 21, wherein the CSI configuration configures CSI-RS for a type-II port selection codebook.

23. The method of claim 21, wherein at least one CSI-RS resource comprises a plurality of ports, each port associated with a different BS transmit beam for CSI-RS.

24. The method of claim 21, wherein at least one of the CSI-RS resource sets comprises a plurality of CSI-RS resources.

25. The method of claim 21, wherein, for each of the CSI-RS resource sets, the CSI configuration indicates whether CSI-RS repetition is configured.

26. An apparatus for wireless communication, the apparatus comprising:
  a memory; and
  at least one processor coupled with the memory, the processor and memory configured to:
    receive a single transmission configuration indicator (TCI) state from another apparatus;
    determine two or more receive beams of the apparatus based, at least in part, on the single TCI state; and
    receive a multi-beam data transmission from the other apparatus using the determined two or more receive beams.

27. The apparatus of claim 26, wherein the memory and processor are further configured to perform one or more beam management procedures including:
  measuring a plurality of repetitions of a reference signal (RS) from the other apparatus using a plurality of receive beams, each of the repetitions transmitted via a first set of a plurality of transmit beams; and
  determining one or more preferred receive beams, of the plurality of receive beams, based on the measured plurality of repetitions.

28. The apparatus of claim 27, wherein the memory and processor being configured to perform the one or more beam management procedures comprise the memory and processor being configured to:
  measure another RS from the other apparatus using the one or more preferred receive beams, the other RS associated with the first set of transmit beams; and
  report channel state information (CSI) to the other apparatus based on the measurement, and wherein:
    the CSI includes at least precoding matrix indicator (PMI) feedback;
    the single TCI state indicates the other RS; and
    the determining the one or more receive beams based, at least in part, on the single TCI state comprises determining the one or more preferred receive beams associated with the another RS indicated by the single TCI state.

29. The apparatus of claim 28, wherein the memory and processor being configured to determine the two or more UE receive beams based, at least in part, on the single TCI state comprises the memory and processor being configured to:
  determine analog detecting based on the one or more preferred receive beams associated with the single TCI state;
  determine digital detecting based on one or more demodulation reference signals (DMRS) associated with the multi-beam data transmission; and
  determine one or more hybrid detecting UE receive beams based on the analog detecting and the digital detecting.

30. The apparatus of claim 27, wherein the memory and processor being configured to perform the one or more beam management procedures comprise the memory and processor being configured to:
  measure a plurality of RSs from the other apparatus, each of the RSs associated with a different transmit beam; and
  determine a plurality of preferred transmit beams based on the measurements, and wherein the first set of transmit beams comprises the plurality of preferred transmit beams.

31. The apparatus of claim 27, wherein the memory and processor being configured to determine the one or more preferred receive beams comprises the memory and processor being configured to: select one or more UE receive beams from a predefined beam codebook or generate one or more UE receive beams without using a predefined beam codebook.

32. The apparatus of claim 27, wherein the memory and processor configured to perform the one or more beam management procedures comprise the memory and processor configured to:
measure a plurality of RSs from the BS, each of the RSs associated with a different BS transmit beam; and
determine a plurality of preferred BS transmit beams based on the measurements, and wherein the first set of BS transmit beams comprises the plurality of preferred BS transmit beams.

33. The apparatus of claim 27, wherein the memory and processor are further configured to:
receive a channel state information (CSI) configuration for the one or more beam management procedures, the CSI configuration configuring the UE with at least one CSI reference signal (CSI-RS) resource set, each CSI-RS resource set including one or more CSI-RS resources comprising a number of available ports, wherein the RS from the BS comprises CSI-RS, and
wherein the memory and processor configured to measure the plurality of repetitions of the RS comprise the memory and processor configured to measure each CSI-RS using the CSI-RS resources in a CSI-RS resource set.

34. The apparatus of claim 33, wherein the CSI configuration configures CSI-RS for a type-II port selection codebook.

35. The apparatus of claim 34, wherein the UE is restricted to selecting only adjacent beams.

36. The apparatus of claim 33, wherein at least one CSI-RS resource comprises a plurality of ports, each port associated with a different BS transmit beam for CSI-RS.

37. The apparatus of claim 33, wherein at least one of the CSI-RS resource sets comprises a plurality of CSI-RS resources.

38. The apparatus of claim 33, wherein, for each of the CSI-RS resource sets, the CSI configuration indicates whether CSI-RS repetition is configured.

39. An apparatus for wireless communication, the apparatus comprising:
a memory; and
at least one processor coupled with the memory, the processor and memory configured to:
determine multiple transmit beams to use for sending a multi-beam data transmission;
send a single transmission configuration indicator (TCI) state to another apparatus to indicate the multiple transmit beams; and
send a multi-beam data transmission to the other apparatus based on the single TCI state.

40. An apparatus for wireless communications, the apparatus comprising:
means for receiving a single transmission configuration indicator (TCI) state from a base station (BS);
means for determining two or more user equipment (UE) receive beams based, at least in part, on the received single TCI state; and
means for receiving a multi-beam data transmission from the BS using the determined two or more UE receive beams.

41. An apparatus for wireless communications, the apparatus comprising:
means for determining multiple transmit beams to use for sending a multi-beam data transmission;
means for sending, to a user equipment (UE), a single transmission configuration indicator (TCI) state to indicate the multiple transmit beams; and
means for sending the multi-beam data transmission to the UE based on the single TCI state.

42. A non-transitory computer readable medium storing computer executable instructions in a memory accessible to a processor for wireless communication by a user equipment (UE), the instructions comprising:
code for receiving a single transmission configuration indicator (TCI) state from a base station (BS);
code for determining two or more UE receive beams based, at least in part, on the received single TCI state; and
code for receiving a multi-beam data transmission from the BS using the determined two or more UE receive beams.

43. The non-transitory computer readable medium of claim 42, further comprising code for performing one or more beam management procedures, the one or more beam management procedures including:
measuring a plurality of repetitions of a reference signal (RS) from the BS using a plurality of UE receive beams, each of the repetitions transmitted via a first set of a plurality of BS transmit beams; and
determining one or more preferred UE receive beams, of the plurality of UE receive beams, based on the measured plurality of repetitions.

44. The non-transitory computer readable medium of claim 43, wherein the code for performing the one or more beam management procedures further includes:
measuring another RS from the BS using the one or more preferred UE receive beams, the other RS associated with the first set of BS transmit beams; and
reporting channel state information (CSI) to the BS based on the measurement, and wherein:
the CSI includes at least precoding matrix indicator (PMI) feedback;
the single TCI state indicates the other RS; and
the determining the two or more UE receive beams based, at least in part, on the single TCI state comprises determining the one or more preferred UE receive beams associated with the other RS indicated by the single TCI state.

45. A non-transitory computer readable medium storing computer executable instructions in a memory accessible to a processor for wireless communication by a base station (BS), the instructions comprising:
code for determining multiple transmit beams to use for sending a multi-beam data transmission;
code for sending, to a user equipment (UE), a single transmission configuration indicator (TCI) state to indicate the multiple transmit beams; and
code for sending the multi-beam data transmission to the UE based on the single TCI state.

* * * * *